United States Patent
Kang et al.

(10) Patent No.: US 11,670,199 B2
(45) Date of Patent: Jun. 6, 2023

(54) DISPLAY DEVICE

(71) Applicant: LG Display Co., Ltd., Seoul (KR)

(72) Inventors: ChounSung Kang, Gimpo-si (KR); GeunChang Park, Goyang-si (KR); Daeyun Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 42 days.

(21) Appl. No.: 17/507,404

(22) Filed: Oct. 21, 2021

(65) Prior Publication Data
US 2022/0130289 A1  Apr. 28, 2022

(30) Foreign Application Priority Data

Oct. 27, 2020 (KR) .................... 10-2020-0140587
May 31, 2021 (KR) .................... 10-2021-0070426

(51) Int. Cl.
  *G06F 1/16* (2006.01)
  *G09F 9/30* (2006.01)

(52) U.S. Cl.
  CPC ............ *G09F 9/301* (2013.01); *G06F 1/1652* (2013.01); *G06F 1/1656* (2013.01)

(58) Field of Classification Search
  CPC combination set(s) only.
  See application file for complete search history.

(56) References Cited

U.S. PATENT DOCUMENTS

| | | | |
|---|---|---|---|
| 9,756,757 B2 | 9/2017 | Park et al. | |
| 9,760,975 B2 | 9/2017 | Kim et al. | |
| 9,864,412 B2 | 1/2018 | Park et al. | |
| 10,362,690 B2 | 7/2019 | Han | |
| 10,782,740 B2 | 9/2020 | Kim et al. | |
| 11,087,648 B2 | 8/2021 | Lee et al. | |
| 11,089,700 B2* | 8/2021 | Kang | G06F 1/1652 |
| 11,199,877 B2 | 12/2021 | Kim et al. | |
| 11,234,337 B2* | 1/2022 | Song | G06F 1/1652 |
| 11,256,295 B2* | 2/2022 | Lee | G06F 1/1616 |
| 11,270,606 B2* | 3/2022 | Kwon | G09F 9/301 |
| 11,443,660 B2* | 9/2022 | Pyo | G09F 9/301 |
| 11,452,245 B2 | 9/2022 | Song | |
| 11,455,913 B2* | 9/2022 | Kwon | H01L 51/5246 |
| 11,468,801 B2 | 10/2022 | Oh | |
| 2016/0363960 A1 | 12/2016 | Park et al. | |

(Continued)

FOREIGN PATENT DOCUMENTS

| | | |
|---|---|---|
| JP | 2016-130853 A | 7/2016 |
| JP | 2017-198970 A | 11/2017 |

(Continued)

*Primary Examiner* — Lisa Lea-Edmonds
(74) *Attorney, Agent, or Firm* — Seed IP Law Group LLP

(57) ABSTRACT

A display device includes a display panel, a first cover supporting a rear surface of the display panel and a second cover with a first end of the second cover connected to the first cover. The display device also includes a roller to which a second end of the second cover is fixed with the roller configured to wind or unwind the display panel. The display device further includes a fastening member configured to fix the second end of the second cover to the roller. The roller includes a flat part and a curved part, and the flat part includes a first flat portion and a second flat portion that is closer to a center surface of the roller than the first flat portion. The fastening member is disposed on the second flat portion.

22 Claims, 23 Drawing Sheets

(56) References Cited

U.S. PATENT DOCUMENTS

| | | | |
|---|---|---|---|
| 2017/0161868 A1 | 6/2017 | Kim et al. | |
| 2019/0037710 A1 | 1/2019 | Han | |
| 2019/0324501 A1 | 10/2019 | Kim et al. | |
| 2020/0205301 A1 | 6/2020 | Song | |
| 2021/0007230 A1* | 1/2021 | Kang | H05K 5/0017 |
| 2021/0012688 A1 | 1/2021 | Lee et al. | |
| 2021/0074189 A1* | 3/2021 | Kwon | H05K 5/0017 |
| 2021/0090476 A1* | 3/2021 | Kang | H01L 51/5246 |
| 2021/0142698 A1 | 5/2021 | Oh | |
| 2021/0272484 A1* | 9/2021 | Pyo | G06F 1/1624 |
| 2022/0069249 A1* | 3/2022 | Kim | H01L 51/5259 |
| 2022/0130288 A1* | 4/2022 | Park | G06F 1/1652 |
| 2022/0139275 A1 | 5/2022 | Pyo | |

FOREIGN PATENT DOCUMENTS

| | | |
|---|---|---|
| JP | 2018-168611 A | 11/2018 |
| JP | 2020-076986 A | 5/2020 |
| KR | 10-2020-0031947 A | 3/2020 |
| KR | 10-2020-0056636 A | 5/2020 |
| KR | 10-2020-0079855 A | 7/2020 |
| KR | 10-2021-0020726 A | 2/2021 |

\* cited by examiner

DISPLAY DEVICE

CROSS-REFERENCE TO RELATED APPLICATIONS

This application claims the priority of Korean Patent Applications No. 10-2020-0140587 filed on Oct. 27, 2020 and No. 10-2021-0070426 filed on May 31, 2021, in the Korean Intellectual Property Office, the entire disclosure of both of which is incorporated herein by reference.

BACKGROUND

Technical Field

The present disclosure relates to a display device, and more particularly, to a rollable display device which can display an image even when rolled up.

Description of the Related Art

Display devices employed by the monitor of a computer, a TV, a mobile phone or the like include an organic light emitting display (OLED) device that emits light by itself, a liquid crystal display (LCD) device that requires a separate light source, and the like.

As the display devices have been increasingly applied to diverse fields such as a computer monitor, a TV, and a personal mobile device, display devices having a large display area and a reduced volume and weight have been studied.

Recently, a rollable display device which can display an image even when rolled up has attracted attention as a next-generation display device.

BRIEF SUMMARY

A display device according to the present disclosure is capable of minimizing a grinding phenomenon, which may occur between a fastening member and a cover part, while a display panel is wound.

A display device according to the present disclosure is also capable of suppressing a grinding phenomenon, which may occur when a protruding cover part scratches a surface of a roller, while a display panel is wound.

A display device according to the present disclosure is further capable of seating a cover part at its regular position while a display panel is wound.

A display device according to the present disclosure is capable of minimizing damage to a display panel while the display panel is wound in the presence of a length tolerance or fastening tolerance of a first cover or a second cover.

A display device according to the present disclosure is capable of minimizing the occurrence of creases in a display panel while the display panel is wound in the presence of a length tolerance of a first cover.

According to the present disclosure, it is possible to minimize damage to a cover part caused by a fastening member.

According to the present disclosure, it is possible to suppress abrasion and noise caused by a contact between one end of the cover part and a flat part of a roller while a display panel is wound.

According to the present disclosure, it is possible to minimize the dislocation of the cover part which may be caused by a length tolerance or fastening tolerance between a first cover and a second cover.

According to the present disclosure, it is possible to minimize damage to a display panel which may be caused by a length tolerance or fastening tolerance between a first cover and a second cover while the display panel is wound.

According to the present disclosure, it is possible to minimize the visibility of creases in a display panel which may be caused by a length tolerance of a second cover.

The benefits and advantages of the present disclosure are not limited to the above non-limiting examples, and other benefits and advantages, which are not mentioned above, can be clearly understood by those skilled in the art from the following description.

According to an aspect of the present disclosure, the display device includes a display panel, a first cover supporting a rear surface of the display panel and a second cover whose one end is connected to the first cover. The display device also includes a roller to which the other end of the second cover is fixed and which is configured to wind or unwind the display panel. The display device further includes a fastening member configured to fix the other end of the second cover to the roller. The roller includes a flat part and a curved part, and the flat part includes a first flat portion and a second flat portion that is closer to a center surface of the roller than the first flat portion. The fastening member is disposed on the second flat portion.

According to another aspect of the present disclosure, the display device includes a display panel configured to display images and a first cover attached to the display panel. The display device also includes a roller including a flat part and a curved part, including a first flat portion and a second flat portion located further inside the roller than the first flat portion, and configured to wind or unwind the display panel and the first cover. The display device further includes a second cover configured to connect the first cover and the roller, and a fastening member configured to fix the second cover to the roller on the second flat portion.

According to yet another aspect of the present disclosure, the roller further includes a groove dug into the first flat portion, and a cover part further includes a guide portion protruding from a lower surface of the cover part so as to correspond to the groove of the roller.

In an embodiment, a rollable display device includes a display element, lines, and other like components on a flexible substrate made of flexible plastic.

Other detailed matters of the embodiments of the disclosure are included in the detailed description with reference to the enclosed drawings.

BRIEF DESCRIPTION OF THE SEVERAL VIEWS OF THE DRAWINGS

The above and other aspects, features and other advantages of the present disclosure will be more clearly understood from the following detailed description taken in conjunction with the accompanying drawings, in which.

DETAILED DESCRIPTION

Figure 1A:
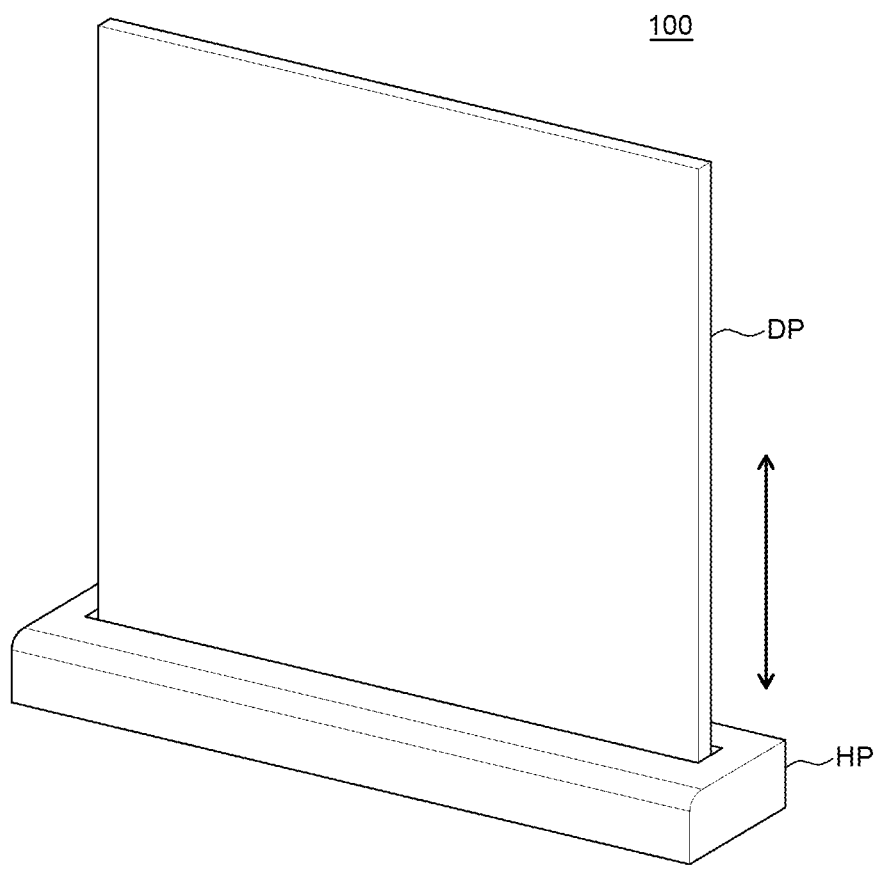
FIG. 1A and FIG. 1B are front perspective views of a display device according to an embodiment of the present disclosure.

Advantages and characteristics of the present disclosure and a method of achieving the advantages and characteristics will be clear by referring to the embodiments described below in detail together with the accompanying drawings. However, the present disclosure is not limited to the embodiments disclosed herein but will be implemented in various forms. The embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only." Any references to singular may include plural unless expressly stated otherwise.

Components are interpreted to include an ordinary error range even if not expressly stated.

When the position relation between two parts is described using the terms such as "on," "above," "below," and "next," one or more parts may be positioned between the two parts unless the terms are used with the term "immediately" or "directly."

When an element or layer is disposed "on" another element or layer, another layer or another element may be interposed directly on the other element or therebetween.

Although the terms "first," "second," and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, various embodiments of the present disclosure will be described in detail with reference to the accompanying drawings.

Display Device-Rollable Display Device

A rollable display device may refer to a display device which can display an image even when rolled up. The rollable display device may have higher flexibility than conventional typical display devices. The rollable display device may be freely changed in shape depending on whether the rollable display device is in use or not. Specifically, when the rollable display device is not used, the rollable display device may be accommodated in a rolled up configuration to reduce its volume. When the rollable display device is used, the rolled display device may be unrolled.

Figure 1B:
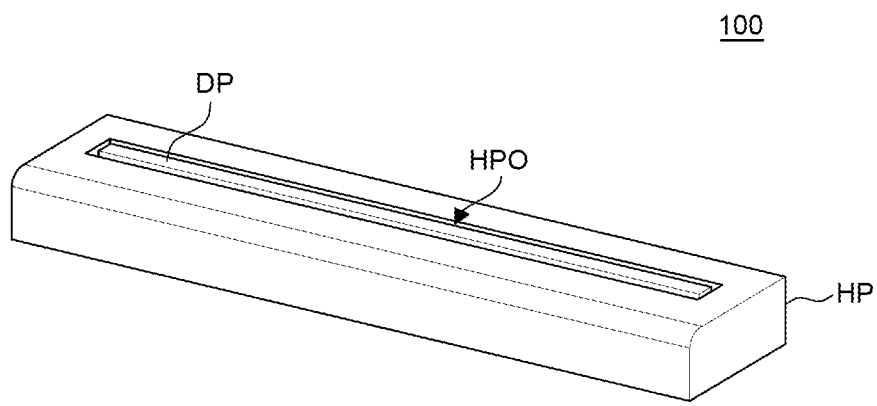

FIG. 1A and FIG. 1B are perspective views of a display device according to an embodiment of the present disclosure. Referring to FIG. 1A and FIG. 1B, the display device according to an embodiment of the present disclosure includes a display part DP (which may also be referred to herein as a display DP or a display assembly DP) and a housing part HP (which may also be referred to herein as a housing HP).

The display part DP is configured to display images to a user. For example, display elements, circuits for driving the display elements, lines, other components, and the like may be disposed in the display part DP. Herein, the display device 100 according to an embodiment of the present disclosure is a rollable display device 100. Therefore, the display part DP may be configured to be wound and unwound. For example, the display part DP may include a display panel 120 and a first cover 110a which are flexible so as to be wound or unwound. More details of the display part DP will be described later with reference to FIG. 4A through FIG. 5C.

The housing part HP serves as a case where the display part DP may be accommodated.

The housing part HP includes an opening HPO through which the display part DP may move in and out of the housing part HP.

Meanwhile, the display part DP of the display device 100 may be manipulated from a fully unwound state extending from the housing part HP, as shown in FIG. 1A to a fully wound state with the display part DP received in the housing part HP, as shown in FIG. 1B, through the opening HPO in the housing part HP, and vice versa.

A driving part MP (which may also be referred to herein as a drive MP or a driving assembly MP) for winding or unwinding the display part DP to change the display part DP between the fully unwound state or the fully wound state is provided.

Driving Part

Figure 2:
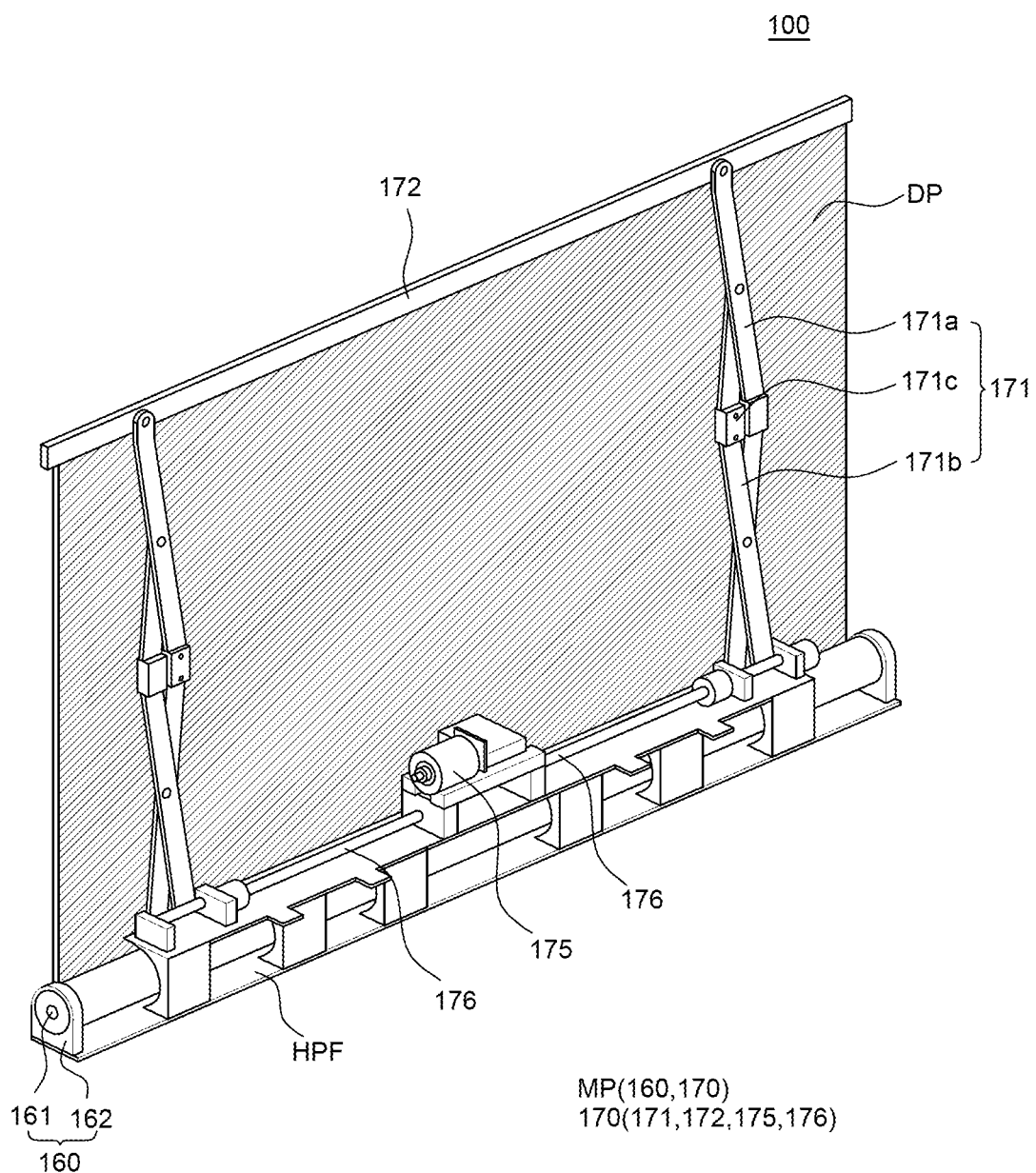
FIG. 2 is a rear perspective view of the display device of FIG. 1A according to an embodiment of the present disclosure.
Figure 3:
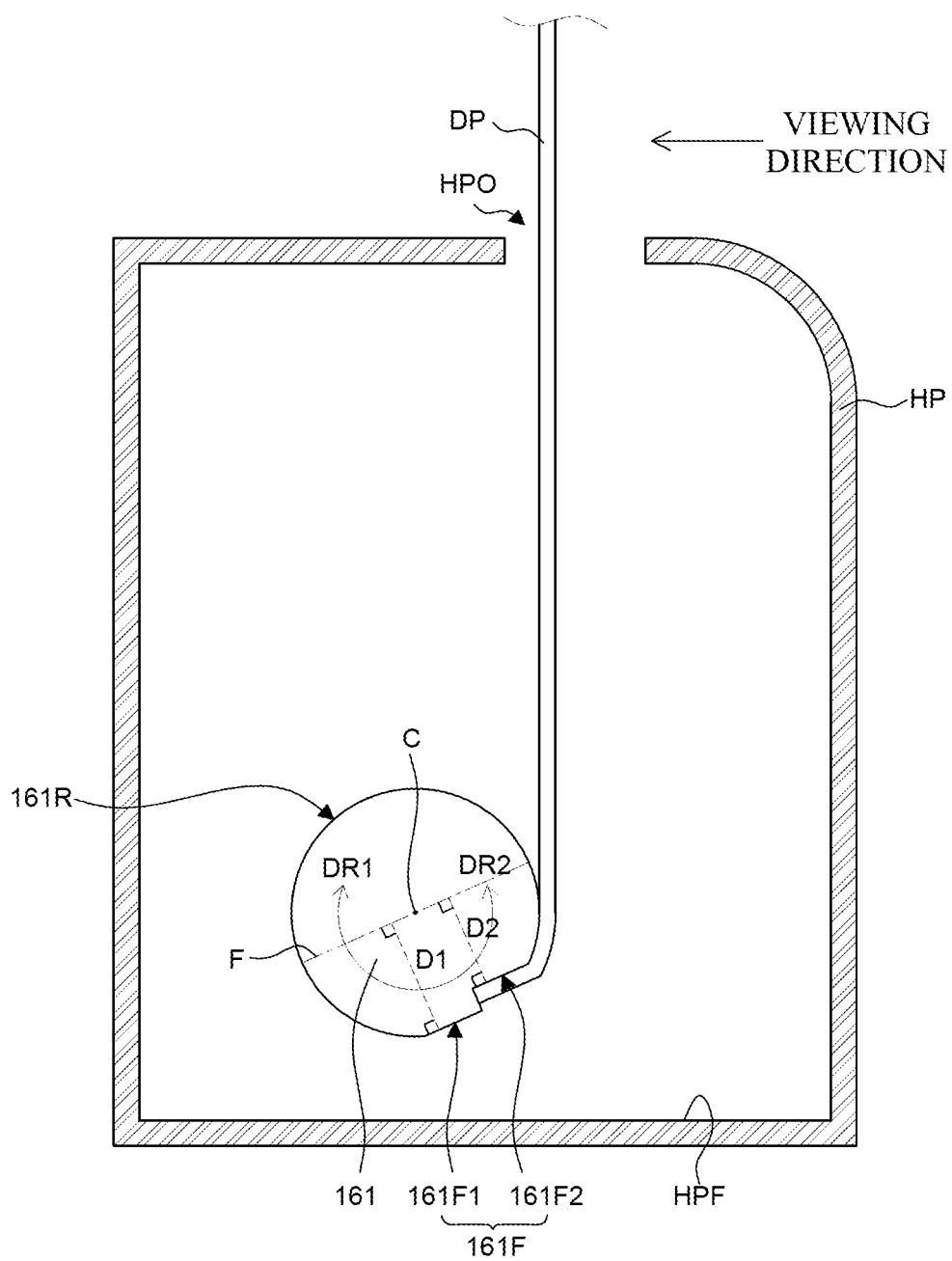
FIG. 3 is a schematic cross-sectional view of the display device of FIG. 1A according to an embodiment of the present disclosure.

FIG. 2 is a perspective view of the display device 100 according to an embodiment of the present disclosure. FIG. 3 is a schematic cross-sectional view of the display device 100 according to an embodiment of the present disclosure. In particular, FIG. 3 is a schematic cross-sectional view provided to explain a roller 161 and the display part DP of the display device 100 according to an embodiment of the present disclosure. For the convenience of description, FIG. 3 illustrates only the housing part HP, the roller 161, and the display part DP.

Referring to FIG. 2, the driving part MP includes a roller unit 160 (which may also be referred to herein as a roller assembly 160) and a lifting unit 170 (which may also be referred to herein as a lifting assembly 170).

The display part DP is coupled to the roller unit 160 and the roller unit 160 winds or unwinds the display part DP by rotating clockwise or counterclockwise. The roller unit 160 includes the roller 161 and a roller support unit 162 (which may also be referred to herein as a roller support 162 or a support 162).

The roller 161 is a member on which the display part DP is wound. The roller 161 may have, in one non-limiting example, a cylindrical shape. A lower edge of the display part DP may be fixed to the roller 161. When the roller 161 rotates, the display part DP whose lower edge is fixed to the roller 161 may be wound on the roller 161. On the contrary, when the roller 161 rotates in the opposite direction, the display part DP wound on the roller 161 may be unwound from the roller 161.

Referring to FIG. 3, the roller 161 may include at least a part of the outer peripheral surface having a flat surface and the other part having a curved surface. The roller 161 has a cylindrical shape overall but may be partially flat along a circumference of the roller 161. That is, a part of the outer peripheral surface of the roller 161 is flat and the other part of the outer peripheral surface is curved. For example, the roller 161 may include a curved part 161R and a flat part 161F. In some embodiments, a plurality of flexible films and a printed circuit board of the display part DP may be mounted on the flat part 161F of the roller 161. The roller 161 may have a completely cylindrical shape or may have any shape on which the display part DP can be wound, but is not limited thereto.

The flat part 161F of the roller 161 include two flat surfaces with different heights, positions, or orientations relative to a center C of the roller 161. That is, the flat part 161F of the roller 161 may have a step. The flat part 161F of the roller 161 may include a first flat portion 161F1 at a first distance D1 from a center surface F of the roller 161 and a second flat portion 161F2 at a second distance D2 from the center surface F of the roller 161. The first distance D1 may be greater than, less than, or equal to the second distance D2 in one or more embodiments. As shown in FIG. 3, the first distance D1 is greater than the second distance D2 in a preferred embodiment. Here, the second flat portion 161F2 may be fastened with the second cover 110b. Also, the center surface F of the roller 161 may be defined as a virtual plane which is parallel to the flat part 161F of the roller 161 and passes through a center C of the roller 161 regardless of the orientation of the roller 161. In some embodiments, the center surface F of the roller 161 is a horizontal plane through the center C of the roller 161 when the flat part 161F of the roller 161 is facing a flat and planar bottom surface HPB of the housing part HP. The center surface F of the roller 161 maintains its position in response to rotation of the roller 161, such that the center surface F may be at an angle to horizontal depending on the orientation of the roller 161, as in FIG. 3. Fastening between the roller 161 and the second cover 110b will be described later in more detail with reference to FIG. 4A through FIG. 6C.

Returning to FIG. 2 with continuing reference to FIG. 3, the roller support unit 162 supports the roller 161 at both sides of the roller 161. Specifically, the roller support unit 162 may include a plurality of roller support unit 162 placed on a bottom surface HPF of the housing part HP. Further, upper side surfaces of the respective roller support unit 162 are coupled with both opposite ends of the roller 161 in some embodiments. Thus, the roller support unit 162 may support the roller 161 so that the roller 161 is spaced apart from the bottom surface HPF of the housing part HP. Herein, the roller 161 may be rotatably coupled with the roller support unit 162.

The lifting unit 170 moves the display part DP up and down according to driving of the roller unit 160. The lifting unit 170 includes a link unit 171, a head bar 172, a motor 175, and a rotating unit 176 (which may also be referred to herein as a rotation assembly 176 or a ball screw assembly 176).

The link unit 171 of the lifting unit 170 includes a plurality of links 171a and 171b and a hinge unit 171c that connects the plurality of links 171a and 171b. Specifically, the plurality of links 171a and 171b includes a first link 171a and a second link 171b coupled to the first link 171a. The first link 171a and the second link 171b cross each other in the form of scissors and are rotatably fastened by the hinge unit 171c (which may also be referred to herein as a hinge 171c). Thus, when the link unit 171 moves up and down, the plurality of links 171a and 171b may rotate to be away from each other or close to each other. The link unit 171 may include a plurality of links 171a and 171b crossing each other, but is not limited thereto and may include a single link that cannot be crossed as well as more than two links 171a, 171b.

The head bar 172 of the lifting unit 170 is fixed to the uppermost end of the display part DP. The head bar 172 is connected to the link unit 171 and may move the display part DP up and down according to a rotation of the plurality of links 171a and 171b of the link unit 171. That is, the display part DP may be moved up and down by the head bar 172 and the link unit 171.

The head bar 172 shields only a part of a surface adjacent to the uppermost edge of the display part DP so as not to shield or cover images displayed on the front surface of the display part DP. The display part DP and the head bar 172 may be fixed by screws or other fasteners, but the present disclosure is not limited thereto.

The motor 175 may be connected to a power generation unit (which may also be referred to herein as a power supply), such as a separate external power supply or a built-in battery, and supplied with power from the power generation unit. The motor 175 generates rotatory power and supplies driving force to the rotating unit 176.

The rotating unit 176 is connected to the motor 175 and changes a rotary movement of the motor 175 to a linear reciprocal movement. That is, the rotating unit 176 may change rotary movement of the motor 175 to a linear reciprocal movement of a structure fixed to the rotating unit 176. For example, the rotating unit 176 may be implemented as a ball screw including a shaft and a nut clamped to the shaft, but is not limited thereto. The shaft of the rotating unit 176 is coupled to a drive of the motor 175 such that the motor 175 rotates the shaft. The nut translates along the shaft as the shaft rotates with movement of the nut resulting in linear movement of the link unit 171.

The motor 175 and the rotating unit 176 may move the display part DP up and down along with the link unit 171. The link unit 171 has a link structure and may receive driving force from the motor 175 and the rotating unit 176 to repeatedly perform folding and unfolding operations of the display part DP.

Specifically, when the display part DP is wound, as the motor 175 is driven, the structure of the rotating unit 176 may move linearly. That is, a part of the rotating unit 176 connected to one end of the second link 171b may move linearly. Thus, the one end of the second link 171b may move toward the motor 175. Also, the plurality of links 171a and 171b is folded, and, thus, the height of the link unit 171 may decrease. Further, while the plurality of links 171a and 171b is folded, the head bar 172 connected to the first link 171a is moved down. Also, one end of the display part DP connected to the head bar 172 is moved down.

When the display part DP is unwound, as the motor 175 is driven, the structure of the rotating unit 176 may move linearly. That is, a part of the rotating unit 176 connected to one end of the second link 171b may move linearly. Thus, the one end of the second link 171b may move in a direction getting away from the motor 175. Also, the plurality of links 171a and 171b is unfolded, and, thus, the height of the link unit 171 may increase. Further, while the plurality of links 171a and 171b is unfolded, the head bar 172 connected to the first link 171a is moved up. Also, the display part DP connected to the head bar 172 is moved up.

Therefore, when the display part DP is fully wound around the roller 161, the link unit 171 of the lifting unit 170 maintains a folded state. That is, when the display part DP is fully wound around the roller 161, the lifting unit 170 may have a minimum height. When the display part DP is fully unwound, the link unit 171 of the lifting unit 170 maintains an unfolded state. That is, when the display part DP is fully unwound, the lifting unit 170 may have a maximum height.

When the display part DP is wound, the roller 161 may rotate and the display part DP may be wound around the roller 161. Referring to FIG. 3, the lower edge of the display part DP is connected to the roller 161. When the roller 161 rotates in a first direction DR1, i.e., clockwise, the display part DP may be wound around the roller 161 so that a rear surface of the display part DP may be closely contacted with a surface of the roller 161.

When the display part DP is unwound, the roller 161 may rotate and the display part DP may be unwound from the roller 161. Referring to FIG. 3, when the roller 161 rotates in a second direction DR2, i.e., counterclockwise, the display part DP wound around the roller 161 may be unwound from the roller 161 and then presented outside the housing part HP.

In some embodiments, the driving part MP may have a different structure from the above-described driving part MP. That is, the roller unit 160 and the lifting unit 170 may be changed in configuration, structure, operation, and other aspects and still achieve winding and unwinding of the display part DP as described. Some of the components may be omitted or other components may be added to the driving part MP and thus the present disclosure contemplates a number of different configurations of the driving part MP beyond the non-limiting examples described above.

Display Part

Figure 4A:
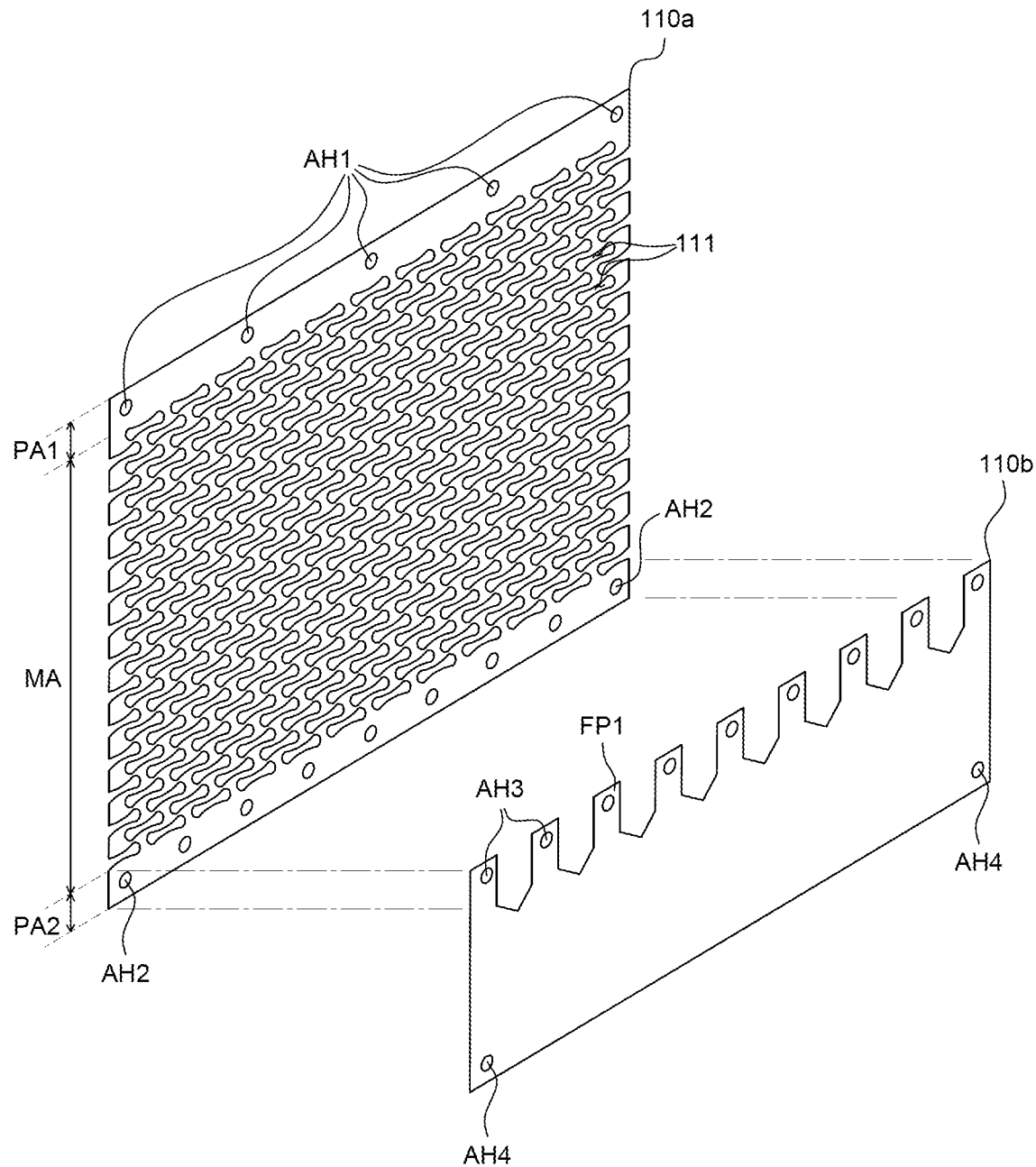
FIG. 4A is an exploded perspective view of a first cover and a second cover of the display device of FIG. 1A according to an embodiment of the present disclosure.
Figure 4B:
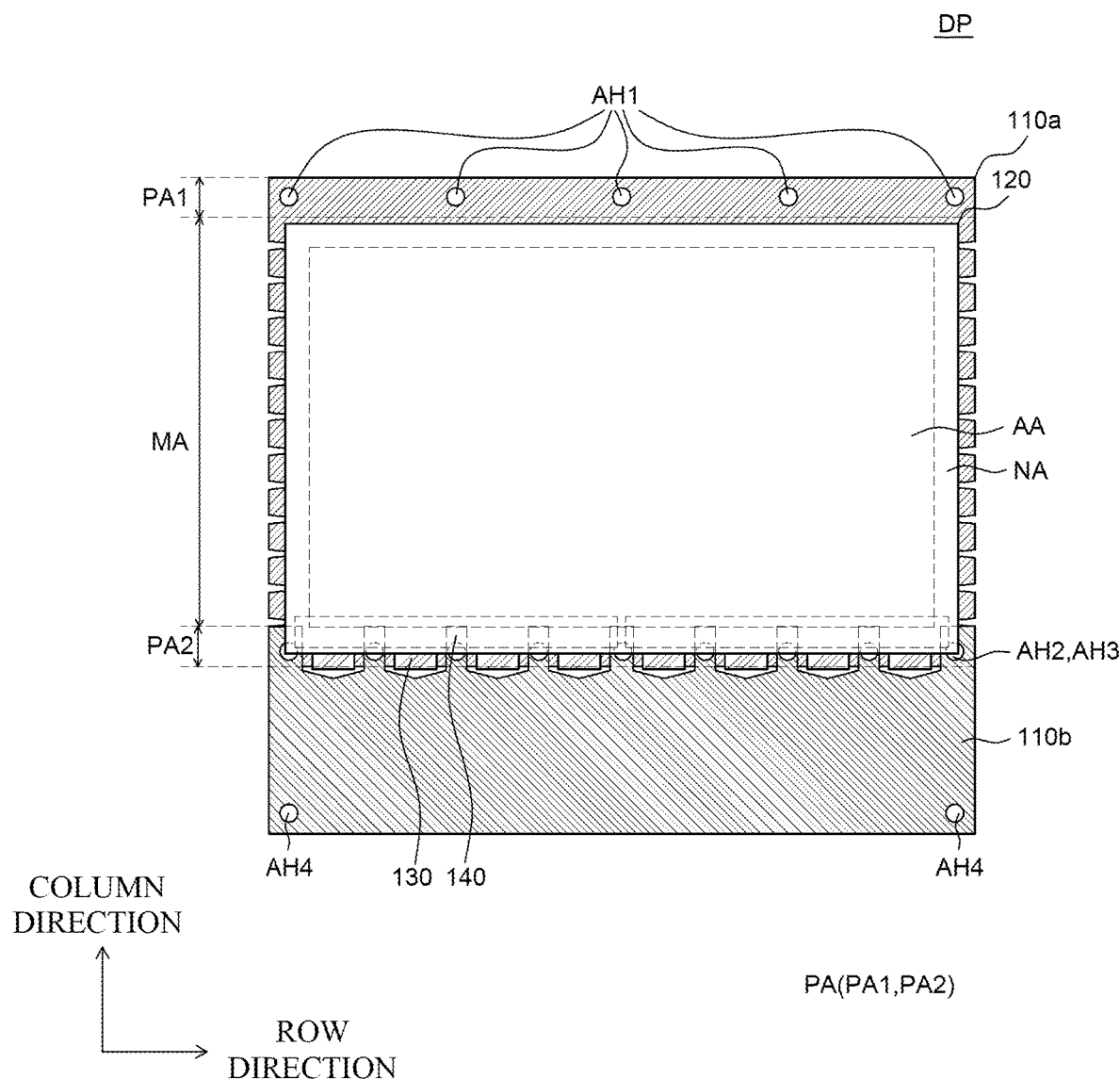
FIG. 4B is an elevational view of a display part of the display device of FIG. 1A according to an embodiment of the present disclosure.

FIG. 4A is an exploded perspective view of a first cover 110a and a second cover 110b of the display device 100 according to an embodiment of the present disclosure. FIG. 4B is an elevational view of a display part DP of the display device 100 according to an embodiment of the present disclosure.

Referring to FIG. 4A and FIG. 4B, the display part DP includes the first cover 110a, a display panel 120, a plurality of flexible films 130, a printed circuit board 140 and the second cover 110b. However, the present disclosure is not limited thereto. The display part DP may be defined as including only the display panel 120, the plurality of flexible films 130 and the printed circuit board 140. For the convenience of description, FIG. 4A and FIG. 4B do not illustrate a cover part and other aspects of the display device 100.

Referring to FIG. 4A and FIG. 4B, the first cover 110a is disposed on a rear surface of the display panel 120, and supports the display panel 120. Since the first cover 110a is disposed on the rear surface of the display panel 120, it may also be referred to as a back cover. The first cover 110a may be larger in size than the display panel 120. The first cover 110a may protect other components of the display part DP from an external environment.

The first cover 110a may be made of a rigid material, but at least a portion of the first cover 110a may be flexible to be wound or unwound along with the display panel 120. For example, the first cover 110a may be made of a metallic material such as Steel Use Stainless SUS or Invar, or plastic, but is not limited thereto. The material of the first cover 110a may be selected depending on design factors, such as the amount of thermal deformation, a radius of curvature, rigidity, and the like in some non-limiting examples.

The first cover 110a may be fastened with the head bar 172 and the second cover 110b.

The first cover 110a includes a plurality of support areas PA and a malleable area MA. The plurality of support areas PA are areas in which a plurality of openings 111 is not disposed, and the malleable area MA is an area in which the plurality of openings 111 is disposed. Specifically, the first cover 110a includes a first support area PA1, the malleable area MA and a second support area PA2. The first support area PA1, the malleable area MA and the second support area PA2 are disposed in sequence from the uppermost end of the first cover 110a. Herein, the first cover 110a is wound or unwound in a column or vertical direction in the orientation shown in FIG. 4A, and, thus, the plurality of support areas PA and the malleable area MA may be disposed along the column or vertical direction.

The first support area PA1 of the first cover 110a is the uppermost area of the first cover 110a and is fastened with the head bar 172. The first support area PA1 may include first fastening holes AH1 structured to receive fasteners to couple the first support area PA1 and the first cover 110a with the head bar 172. For example, screws that pass through the head bar 172 and the first fastening holes AH1 are disposed to fasten the head bar 172 and the first support area PA1. As the first support area PA1 is fastened with the head bar 172, when the link unit 171 fastened to the head bar 172 ascends or descends, the first cover 110a may also ascend or descend together with the display panel 120 attached to the first cover 110a. Although five first fastening holes AH1 are illustrated in FIG. 4A and FIG. 4B, the number of first fastening holes AH1 is not limited thereto and may include more or less than five first fastening holes AH1. Further, although FIG. 4A and FIG. 4B illustrate that the first cover 110a is fastened with the head bar 172 using the first fastening holes AH1, the present disclosure is not limited thereto. The first cover 110a and the head bar 172 may be fastened with each other without a separate fastening hole.

The malleable area MA of the first cover 110a extends from the first support area PA1 to a lower side of the first cover 110a. The malleable area MA is an area in which the plurality of openings 111 is disposed and to which the display panel 120 is attached. Specifically, the malleable area MA is wound around or unwound from the roller 161 together with the display panel 120. The malleable area MA may overlap at least the display panel 120 among other components of the display part DP.

The second support area PA2 of the first cover 110a extends from the malleable area MA, and is the lowermost area of the first cover 110a. In the second support area PA2, one end of the display panel 120 is disposed. For example, in the second support area PA2, a pad area, which is a non-display area at one end of the display panel 120, may be disposed.

Referring to FIG. 4A, the second support area PA2 includes second fastening holes AH2. The second fastening holes AH2 may be configured to couple a cover part to be described later, the second cover 110b and the first cover 110a to each other. Although nine second fastening holes AH2 are illustrated in FIG. 4A, the number of second fastening holes AH2 is illustrative and is not limited thereto and may include more or less than nine second fastening holes AH2.

Meanwhile, the plurality of openings 111 are formed in malleable area MA but are not formed in the first support area PA1 and the second support area PA2. Specifically, the first fastening holes AH1 and the second fastening holes AH2 are formed in the first support area PA1 and the second support area PA2, respectively. Thus, the only openings in the first and second support areas PA1, PA2 may be the first and second fastening holes AH1, AH2, respectively. However, the plurality of openings 111 are only in the malleable area MA and not in the first support area PA1 and the second support area PA2 in some embodiments. In one or more embodiments, the first and second support areas PA1, PA2 may include the openings 111. Also, the first fastening holes AH1 and the second fastening holes AH2 are different in shape from the plurality of openings 111.

The first support area PA1 is an area fixed to the head bar 172, the second support area PA2 is an area where one end of the display panel 120, the plurality of flexible films 130 and the printed circuit board 140 are supported. The first support area PA1 and the second support area PA2 may have a higher rigidity than the malleable area MA. Further, since the first support area PA1 and the second support area PA2 have rigidity, the first support area PA1 and the second support area PA2 may be firmly fixed to the head bar 172 and the second cover 110b. The second support area PA2 may maintain a pad area at one end of the display panel 120 and the printed circuit board 140 in a flat state and thus protect the pad area at the display panel 120 and the printed circuit board 140 during rolling and unrolling of the display panel 120. Therefore, the display part DP may be fixed to the head bar 172 of the driving part MP, thereby moving into and out of the housing part HP according to an operation of the driving part MP described above. Also, it is possible to protect the pad area at the display panel 120 and the printed circuit board 140.

Meanwhile, FIG. 4A illustrates that the plurality of support areas PA and the malleable area MA of the first cover 110a are disposed in sequence along the column direction. However, if the first cover 110a is wound in a row direction, the plurality of support areas PA and the malleable area MA may be disposed along the row direction.

When the display part DP is wound or unwound, the plurality of openings 111 disposed in the malleable area MA of the first cover 110a may be deformed by stress which is applied to the display part DP. Specifically, when the display part DP is wound or unwound, the malleable area MA of the first cover 110a may be deformed as the plurality of openings 111 is contracted or expanded. Further, as the plurality of openings 111 is contracted or expanded, a slip phenomenon of the display panel 120 disposed on the malleable area MA of the first cover 110a is minimized. Thus, the stress applied to the display panel 120 may be minimized.

The second cover 110b may be fastened with the first cover 110a and the roller 161 to connect the first cover 110a to the roller 161. The second cover 110b may connect the first cover 110a to the roller 161 by the above-described method and finally connect the display panel 120 disposed on the first cover 110a to the roller 161. However, the present disclosure is not limited thereto. The shape of the second cover 110b or a connection method may vary depending on the design to achieve coupling the second cover 110b to the first cover 110a and the roller 161. Thus, the present disclosure is not limited thereto.

One end or a first end of the second cover 110b is the uppermost portion of the second cover 110b and may overlap one end of the first cover 110a. For example, one end of the second cover 110b may overlap the second support area PA2 of the first cover 110a. The one end or the first end of the second cover 110b and a portion of the first cover 110a may be connected to each other by overlapping them, or may be connected to each other using a connection member or the like, but the present disclosure is not limited thereto.

The second cover 110b may include a plurality of first fastening parts FP1 that overlaps the first cover 110a. The plurality of first fastening parts FP1 is disposed at one end of the second cover 110b, which may an uppermost end in some embodiments. Also, the plurality of first fastening parts FP1 may include a plurality of third fastening holes AH3 structured to receive fasteners to couple the second cover 110b with the first cover 110a. The plurality of first fastening parts FP1 including the plurality of third fastening holes AH3 are spaced apart from each other and may be spaced equidistant or at any selected distance from each other in some embodiments.

As described herein, the first fastening parts FP1 may have any selected shape. For example, in FIG. 4A, the first fastening parts FP1 generally have a rectangular shape separated from each other by spaces with a trapezoidal shape with a rectangular portion between the first fastening parts FP1 and a triangular portion extending beyond the first fastening parts FP1 into the second cover 110b. Thus, in some embodiments, the spaces between the first fastening parts FP1 may have a height or depth that is greater than a height of the first fastening parts FP1. In some embodiments, the spaces between the first fastening parts FP1 have a size and a shape to receive the plurality of flexible films 130, and specifically bent portions of the plurality of flexible films 130. The third fastening holes AH3 may be holes for fixing the cover part to be described later and the second cover 110b to each other. Although nine third fastening holes AH3 are illustrated in FIG. 4A, the number of third fastening holes AH3 is illustrative and is not limited thereto and the third fastening holes AH3 may include more or less than nine third fastening holes AH3. Further, each first fastening part FP1 may include only one third fastening hole AH3, as in FIG. 4A, or each fastening part FP1 may include more than one or no third fastening holes AH3.

FIG. 4A illustrates that the second fastening holes AH2 and the third fastening holes AH3 for fastening the cover part, the first cover 110a and the second cover 110b are disposed in the second support area PA2 of the first cover 110a and the one end or the upper end of the second cover 110b, respectively. However, the first cover 110a, the second cover 110b and the cover part may be fixed to each other without a separate fastening hole.

Meanwhile, when the second support area PA2 and the plurality of first fastening parts FP1 are wound around the roller 161, the outer peripheral surface of the roller 161 overlapping the second support area PA2 and the plurality of first fastening parts FP1 may be the flat part 161F. Therefore, the second support area PA2 may maintain a flat state regardless of it is wound around or unwound from the roller 161. The pad area at the one end or the bottom end of the display panel 120 and the printed circuit board 140 disposed in the second support area PA2 may also maintain a flat state.

A region from the one end to the other end of the second cover 110b is a region extended in order for the display area AA of the display panel 120 to be disposed outside the housing part HP. For example, when the first cover 110a and the display panel 120 are in a fully unwound state, the region from the other end of the second cover 110b fixed to the roller 161 to the one end of the second cover 110b where the plurality of flexible films 130 and the printed circuit board 140 are disposed may be disposed inside the housing part HP. In other words, the second cover 110b has a size and a shape to be received in the housing part HP in the fully unwound state of the display part DP while also positioning the display area AA of the display panel 120 outside of the housing part HP. The malleable area MA and the first support area PA1 where the display area AA of the display panel 120 is disposed may be disposed outside the housing part HP. That is, the region from the other end of the second cover 110b fixed to the roller 161 to at least a part of the one end of the second cover 110b and the second support area PA2 may be disposed inside the housing part HP.

The other end of the second cover 110b is the lowermost portion of the second cover 110b and fastened with the roller 161. The other end of the second cover 110b may include fourth fastening holes AH4 structured to receive fasteners to couple the second cover 100b with the roller 161. For example, fastening members (which may also be referred to herein as fasteners) that pass through the roller 161 and the fourth fastening holes AH4 may be disposed so that the roller 161 may be fastened with the other end of the second cover 110b. Further, as the other end of the second cover 110b is fastened with the roller 161, the display panel 120, the first cover 110a and the second cover 110b may be wound around or unwound from the roller 161 together as a single assembly. Although two fourth fastening holes AH4 are illustrated in FIG. 4A, the number of fourth fastening holes AH4 is not limited thereto and the display device 100 may include more or less than two fourth fastening holes AH4.

Meanwhile, the plurality of openings 111 are formed in the malleable area MA of the first cover 110a but are not formed in the second cover 110b. Specifically, the third fastening holes AH3 and the fourth fastening holes AH4 are formed at the one end and the other end, respectively, of the second cover 110b and may be the only openings in the second cover 110b in some embodiments. In some embodiments, the plurality of openings 111 may be in the malleable area MA of the first cover 110a as well as in the second cover 110b, as described herein. Also, the third fastening holes AH3 and the fourth fastening holes AH4 are different in shape from the plurality of openings 111.

The second cover 110b may be made of a material having flexibility so as to be wound around or unwound from the roller. For example, the second cover 110b may be made of a plastic material such as PET. However, the material of the second cover 110b is not limited thereto, and may vary depending on design factors, such as the amount of thermal deformation, a radius of curvature, rigidity, and the like in some non-limiting examples.

In the present specification, the first cover 110a and the second cover 110b have been described as being separately provided, but the present disclosure is not limited thereto. The first cover 110a and the second cover 110b may be provided as one body.

Referring to FIG. 4B, the display panel 120 is disposed on one surface of the first cover 110a, which may be a front surface of the first cover 110a in some embodiments. On the one surface of the first cover 110a, the display panel 120 is disposed in the malleable area MA. The display panel 120 is configured to display images to the user. In the display panel 120, display elements for displaying images, driving elements for driving the display elements, and lines for transmitting various signals to the display elements and the driving elements, and the like may be disposed.

The display elements may be defined differently depending on the type of the display panel 120. For example, if the display panel 120 is an organic light emitting display panel 120, the display elements may be organic light emitting elements each composed of an anode, an organic emission layer, and a cathode. For example, if the display panel 120 is a liquid crystal display panel, the display elements may be liquid crystal display elements. Hereinafter, the display panel 120 will be assumed as an organic light emitting display panel, but the display panel 120 is not limited to the organic light emitting display panel. Further, since the display device 100 according to an embodiment of the present disclosure is a rollable display device 100, the display panel 120 may be implemented as a flexible display panel 120 to be wound around or unwound from the roller 161.

The display panel 120 includes a display area AA and a non-display area NA.

The display area AA refers to an area where an image is displayed on the display panel 120. In the display area AA, a plurality of sub-pixels constituting a plurality of pixels and a driving circuit for driving the plurality of sub-pixels may be disposed. Each of the plurality of sub-pixels is a minimum unit of the display area AA, and a display element may be disposed on each of the plurality of sub-pixels. For example, an organic light emitting element composed of an anode, an organic emission layer, and a cathode may be disposed on each of the plurality of sub-pixels, but the present disclosure is not limited thereto. Further, the driving circuit for driving the plurality of sub-pixels may include a driving element, a line, and the like. For example, the driving circuit may be configured by a thin film transistor, a storage capacitor, a gate line, a data line, etc., but is not limited thereto.

The non-display area NA refers to an area where an image is not displayed and may surround the display area AA in some embodiments. In the non-display area NA, various lines, circuits, and the like for driving the organic light emitting elements in the display area AA may be disposed. For example, in the non-display area NA, a link line which transmits signals to the plurality of sub-pixels and driving circuits of the display area AA or a driver IC, such as a gate driver IC or a data driver IC, may be disposed, but the present disclosure is not limited thereto.

Meanwhile, the non-display area NA includes a pad area.

The pad area refers to an area where a plurality of pads is disposed. The plurality of pads refers to electrodes for electrically connecting the plurality of flexible films 130 and the display panel 120. Thus, the plurality of flexible films 130 may be electrically connected to the display panel 120 through the plurality of pads. The pad area may refer to a portion of the non-display area NA that overlaps the second support area PA2 of the first cover 110a. However, the pad area may be formed in another portion of the non-display area NA depending on the layout of the plurality of flexible films 130, but is not limited thereto.

Referring to FIG. 4B, the plurality of flexible films 130 is disposed at one end of the display panel 120, which may be a bottom end of the display panel 120. Each of the plurality of flexible films 130 includes various components on a base film 131 (see FIG. 5B) having flexibility and that serves to supply signals to a plurality of sub-pixels constituting a plurality of pixels and driving circuits in the display area AA. The plurality of flexible films 130 may be electrically connected to the display panel 120. One end of each of the plurality of flexible films 130 is disposed in the non-display area NA of the display panel 120 and supplies power voltage, data voltage, etc., to the plurality of sub-pixels and driving circuits in the display area AA. Although eight flexible films 130 are illustrated in FIG. 4B, the number of flexible films 130 may vary depending on the design and is not limited thereto and may include more or less than eight flexible films 130.

On the base film 131 of each of the plurality of flexible films 130, a driver IC 132 (see FIG. 5B), such as a gate driver IC and a data driver IC, may be disposed. The driver IC 132 is a component which processes data for displaying images and a driving signal for processing the data. The driver IC 132 may be disposed in a chip on glass COG, a chip on film COF, or a tape carrier package TCP manner depending on a mounting method. For the convenience of description, FIG. 4B illustrates that the driver IC 132 is mounted on each of the plurality of flexible films 130 in a chip on film manner, but the present disclosure is not limited thereto.

Meanwhile, each of the plurality of flexible films 130 includes a base film and data for displaying an image and various driver ICs for controlling the data disposed on the base film, and is configured to display an image. The plurality of flexible films 130 is electrically connected to the pad area at the one end, or the bottom end, of the display panel 120 and is bent toward a rear surface of the first cover 110a. One end of each of the plurality of flexible films 130 may be connected to the one end, or the bottom end, of the display panel 120 on one surface of the first cover 110a. Also, the other end of each of the plurality of flexible films 130 may be disposed on a surface opposite to the one surface of the first cover 110a, which may be a front surface of the first cover 110a on which the display panel 120 is disposed. This will be described in detail later with reference to FIG. 5A through FIG. 6.

Referring to FIG. 4B, the printed circuit board 140 is disposed on the rear surface of the first cover 110a and connected to the plurality of flexible films 130. That is, the printed circuit board 140 is disposed on the rear surface of the first cover 110a and electrically connected to the plurality of flexible films 130. The printed circuit board 140 is a component that supplies signals to the driver ICs of the plurality of flexible films 130. The printed circuit board 140 includes various components thereon for supplying various signals, such as a driving signal or a data signal, to the driver ICs. Although two printed circuit boards 140 are illustrated in FIG. 4B, the number of printed circuit boards 140 may vary depending on the design and is not limited thereto.

Although not illustrated in FIG. 4B, an additional printed circuit board connected to the printed circuit board 140 may be further disposed. For example, the printed circuit board 140 may be referred to as a source printed circuit board (source PCB) S-PCB on which a data driver is mounted. The additional printed circuit board connected to the printed circuit board 140 may be referred to as a control printed circuit board (control PCB) C-PCB on which a timing controller or the like is mounted. The additional printed circuit board may be disposed inside the roller 161, or may be disposed outside the roller 161 within the housing part HP, or may be disposed to be directly contacted with the printed circuit board 140.

Cover Part

Figure 5A:
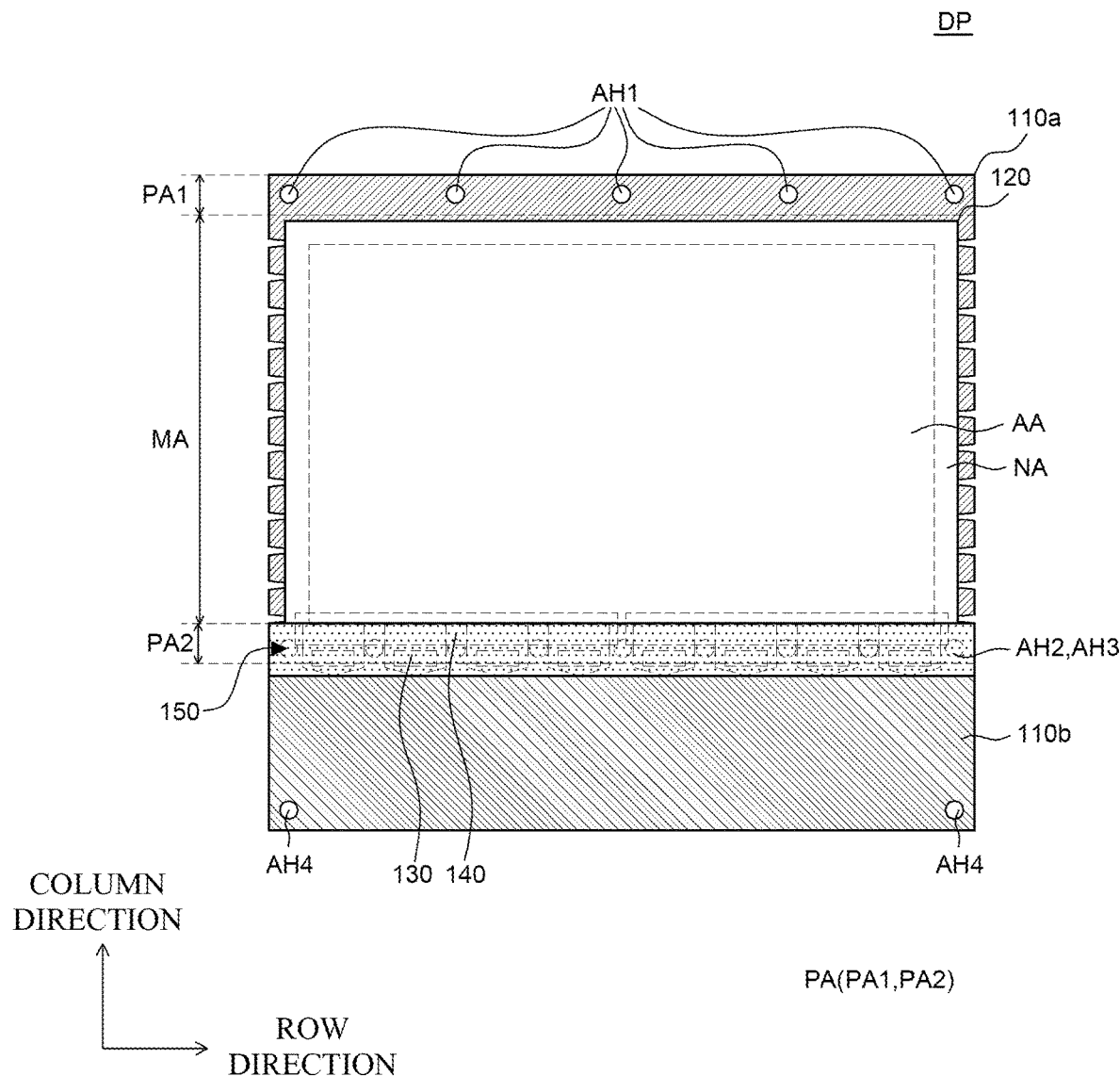
FIG. 5A is an elevational view of the display device of FIG. 1A according to an embodiment of the present disclosure.
Figure 5B:
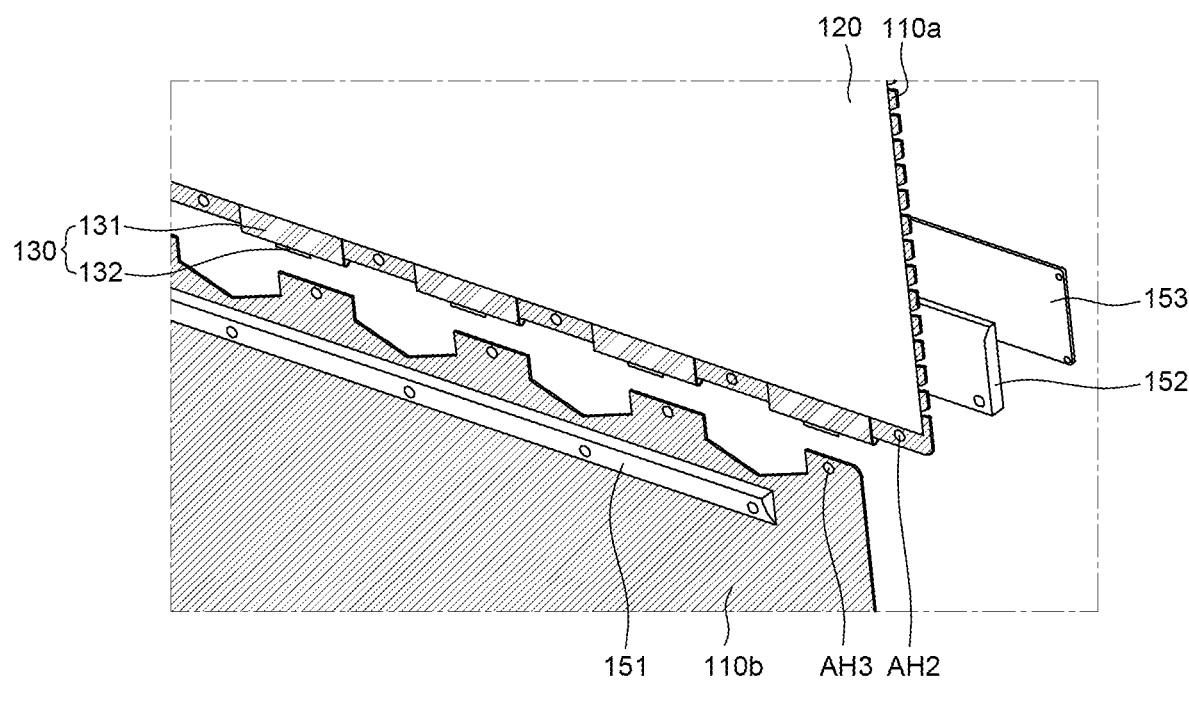
FIG. 5B is an exploded perspective view of the display device of FIG. 5A according to an embodiment of the present disclosure.
Figure 5C:
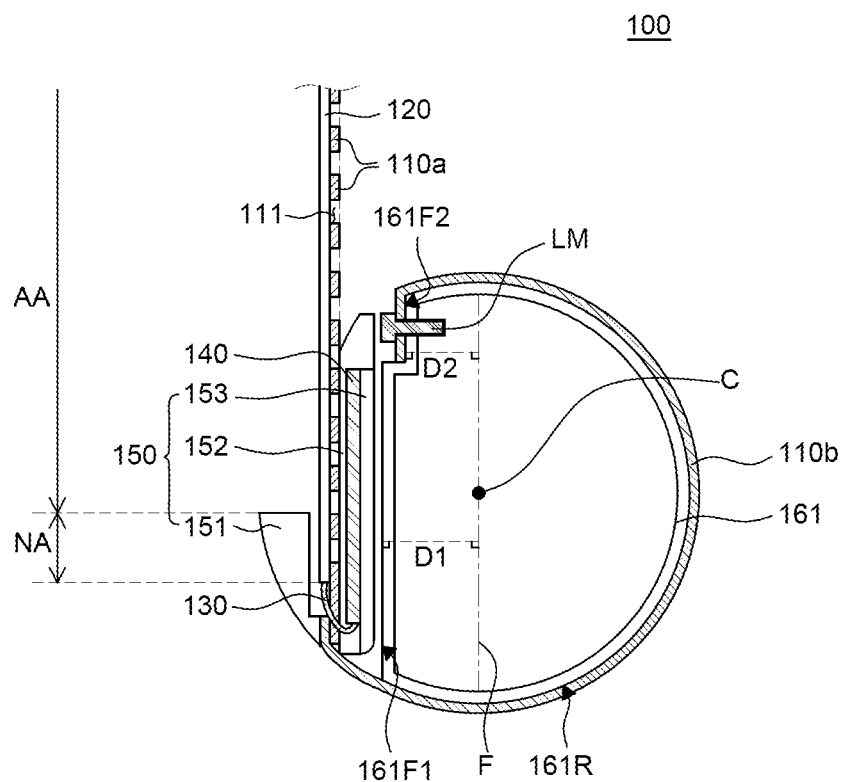
FIG. 5C is a cross-sectional view of the display device of FIG. 5A according to an embodiment of the present disclosure.

FIG. 5A is an elevational view of the display device 100 according to an embodiment of the present disclosure. FIG. 5B is an exploded perspective view of the display device 100 according to an embodiment of the present disclosure. FIG. 5C is a cross-sectional view of the display device 100 according to an embodiment of the present disclosure.

Referring to FIG. 5A through FIG. 5C, the display device 100 includes a cover part 150 (which may also be referred to herein as a cover assembly 150 or a cover connection assembly 150) for accommodating and protecting the pad area of the display panel 120, the plurality of flexible films 130 and the printed circuit board 140. The cover part 150 may be disposed at one end of the second support area PA2 of the first cover 110a, such as a bottom end of the second support area PA2 of the first cover 110a, and at one the second cover 110b, such as a top end of the second cover 110b, and may connect the first cover 110a and the second cover 110b. Also, the cover part 150 may maintain the pad area at the one end of the display panel 120 and the printed circuit board 140 in a flat state during rolling and unrolling operations and thus may protect the plurality of flexible films 130.

Referring to FIG. 5B and FIG. 5C, the cover part 150 includes a top cover 151, a bottom cover 152 and a base plate 153.

The top cover 151 is disposed on one surface of the first cover 110a, such as front surface of the first cover 110a in some embodiments. The top cover 151 is disposed to cover the pad area of the display panel 120, and the plurality of flexible films 130. The top cover 151 may be disposed not to cover the display area AA of the display panel 120, but to cover only the pad area, which is the non-display area NA at the one end of the display panel 120. If the top cover 151 covers the display area AA as well, it may shield an image displayed on the display area AA. Therefore, the top cover 151 may be disposed to overlap only the non-display area NA below the active area AA of the display panel 120.

The top cover 151 may be made of a material having rigidity and thus may not be deformed when the display part DP is wound. Also, the top cover 151 may protect the pad area at the one end, or bottom end, of the display panel 120 and the plurality of flexible films 130.

An outer surface of the top cover 151 has a convex shape, and may be connected to the curved part 161R of the roller 161 to form a round shape with the curved part 161R or a circular shape with the curved part 161R. That is, one surface of the top cover 151 may be a curved surface. When the display part DP is wound, the top cover 151 may be connected to the curved part 161R of the roller 161 to form a round shape with the curved part 161R or a circular shape with the curved part 161R.

The bottom cover 152 is disposed on the surface of the first cover 110a opposite to the one surface of the first cover 110a, i.e., on the rear surface of the first cover 110a. The bottom cover 152 is disposed between the first cover 110a and the printed circuit board 140. The bottom cover 152 may be fixed to the one end of the second cover 110b, or the upper end of the second cover 110b, and may be disposed corresponding to the entire second support area PA2 of the first cover 110a and a part of the malleable area MA. The pad area at the one end of the display panel 120, the plurality of flexible films 130 and the printed circuit board 140 may be mounted on the bottom cover 152.

The base plate 153 is disposed on a rear surface of the bottom cover 152. The base plate 153 may be generally flat and planar and have a plate shape, and may cover the rear surface of bottom cover 152 and an exposed surface of the printed circuit board 140.

Here, the first cover 110a and the second cover 110b may be fastened by fixing members or fasteners that pass through the top cover 151, the second cover 110b, the first cover 110a, the bottom cover 152 and the base plate 153. The fixing members may be, for example, screw members, such as screws or bolts, but are not limited thereto.

The base plate 153 may be disposed corresponding to a position where the printed circuit board 140 is mounted on the bottom cover 152. Also, the bottom cover 152 has a groove corresponding in shape to the base plate 153, and the base plate 153 is mounted on the bottom cover 152 in the groove of the bottom cover 152. A surface formed by connecting one surface of the bottom cover 152 and one surface of the base plate 153 may be a flat surface without a protrusion.

Accordingly, the base plate 153 covers the exposed surface of the printed circuit board 140 and thus may accommodate the printed circuit board 140 without exposing the printed circuit board 140 to the outside. Also, the rear surface of the bottom cover 152 does not have a protrusion, and, thus, when the cover part 150 is wound around the roller 161, the cover part 150 may be completely mounted on the flat part 161F of the roller 161.

Referring to FIG. 5C, the plurality of flexible films 130 may be bent from the one end, or the bottom end, of the display panel 120 so as to cover an end portion of the first cover 110a. The flexible films 130 that are electrically connected to the pad area at the one end, or the bottom end, of the display panel 120 are bent from an end portion of the first cover 110a toward the rear surface of the bottom cover 152. Then, the flexible films 130 may be electrically connected to the printed circuit board 140 mounted on the rear surface of the bottom cover 152. Here, the second cover 110b may include the plurality of first fastening parts FP1 that overlap the first cover 110a, and the plurality of flexible films 130 may be bent at the end portion of the first cover 110a through a space between the plurality of first fastening parts FP1.

The display device 100 according to an embodiment of the present disclosure includes the cover part 150 that maintains the pad area of the display panel 120 and the printed circuit board 140 in a flat state. Thus, it is possible to minimize damage to the display panel 120 and the printed circuit board 140. Specifically, when the display part DP is wound around the roller 161, the first cover 110a and the second cover 110b may be wound while being bent according to the shape of the roller 161. The display panel 120 and the printed circuit board 140 may also be wound while being bent according to the shape of the roller 161.

Meanwhile, in a conventional display that is repeatedly wound and unwound, cracks are highly likely to occur in the vicinity of the edge of the display panel. For example, when the pad area of the display panel is repeatedly bent, cracks are highly likely to occur in the vicinity of the pad area. In the pad area, a plurality of pads, various lines, and the like which are made of a metallic material having a high rigidity and a low flexibility may be disposed and they may be easily cracked due to stress. The cracks may spread to the other parts of the display panel, which may result in a defect of the display device. Further, when the printed circuit board of a conventional display is made of a rigid material and bent, the printed circuit board may be broken.

Therefore, the pad area of the display panel 120 and the printed circuit board 140 of the present disclosure may be disposed on the rear surface of the bottom cover 152 of the cover part 150 which are made of a material having rigidity to overcome the above disadvantages of conventional displays. Accordingly, the pad area and the printed circuit board 140 may be maintained in a flat state and may be protected. Then, the second support area PA2 of the first cover 110a having rigidity and the one end of the second cover 110b are allowed to overlap the pad area and the printed circuit board 140. Thus, the pad area and the printed circuit board 140 may be supported to be maintained in a flat state according to the embodiments of the display device 100 herein. Also, the roller 161 has the flat part 161F on which the cover part 150 is wound. Thus, the pad area, the printed circuit board 140 and the bottom cover 152 may be wound around the roller 161 while being maintained in a flat state or configuration. Therefore, even when the pad area and the printed circuit board 140 are wound around the roller 161, they may be maintained in a flat state. For example, when the display part DP is fully wound, the pad area and the printed circuit board 140 are mounted on the flat part 161F of the roller 161 so as to be flat. Also, the top cover 151 covers the pad area and the bottom cover 152 and the base plate 153 are disposed to cover the printed circuit board 140. Therefore, even when another portion of the display part DP is wound on the pad area and the printed circuit board 140, it is possible to suppress interference with the pad area and the printed circuit board 140 according to the present disclosure.

Accordingly, the display device 100 according to an embodiment of the present disclosure includes the cover part 150 that supports the pad area and the printed circuit board 140 during rolling and unrolling operations. Thus, it is possible to maintain the pad area and the printed circuit board 140 in a flat state and protect the pad area and the printed circuit board 140 from external impacts. Moreover, in the display device 100 according to an embodiment of the present disclosure, the flat part 161F is formed as the outer peripheral surface of the roller 161. Thus, it is possible to suppress bending of the pad area and the printed circuit board 140 and also possible to minimize damage to the display panel 120 and the printed circuit board 140.

Flat Part of Roller

FIG. 5C is a cross-sectional view of the display device according to an embodiment of the present disclosure.

Referring to FIG. 5C, the flat part 161F of the roller 161 may include two flat surfaces different in height relative to the center surface F of the roller 161. That is, the flat part 161F of the roller 161 may have a step down or a step up configuration. The flat part 161F of the roller 161 includes the first flat portion 161F1 at a relatively greater distance D1 from the center surface F of the roller 161 and the second flat portion 161F2 at a relatively smaller distance D2 from the center surface F of the roller 161 in one embodiment, although the distance D1 may also be less than or equal to the distance D2 in some embodiments. That is, the distance D1 from the center surface F of the roller 161 to the first flat portion 161F1 may be greater than the distance D2 from the center surface F of the roller 161 to the second flat portion 161F2.

The first flat portion 161F1 of the roller 161 is a flat portion which is relatively farther from the center surface F of the roller 161 and on which the cover part 150 is seated during a winding operation. Since the cover part 150 is seated on the first flat portion 161F1, it is possible to suppress bending of the pad area and the printed circuit board 140 and minimize damage to the display panel 120 and the printed circuit board 140 as described above. For the convenience of illustration, FIG. 5C shows that the cover part 150 is spaced apart from the first flat portion 161F1. However, the cover part 150 may be in direct contact with the first flat portion 161F1 in practice.

The second flat portion 161F2 of the roller 161 is a flat portion which is relatively closer to the center surface F of the roller 161 and with which the second cover 110b is fastened. For example, as shown in FIG. 5C, the second cover 110b may be fastened with the second flat portion 161F2 of the roller 161 through a fastening member LM (which may also be referred to herein as a fastener LM). Here, the second flat portion 161F2 of the roller 161 is relatively closer to the center surface F of the roller 161 than the first flat portion 161F1, and, thus, the flat part 161F of the roller 161 has a step. Accordingly, in a state where the second cover 110b is fastened with the second flat portion 161F2 through the fastening member LM, an upper surface or an outer surface of the fastening member LM may be located lower than an upper surface of the first flat portion 161F1 relative to the center surface F. In other words, the fastening member LM may be recessed relative to the first flat portion 161F1, although the fastening member LM may also be coplanar with the first flat portion 161F1 in some embodiments. Also, the cover part 150 may be spaced apart from the second flat portion 161F2 of the roller 161 and the fastening member LM during a winding operation.

The fastening member LM is a member for fixing the other end of the second cover 110b to the roller 161. The fastening member LM may fix the second cover 110b to the roller 161 in the second flat portion 161F2 of the roller 161. The fastening member LM may be a screw member such as a screw or a bolt, but is not limited thereto. The fastening member LM may have a penetration portion with threads for penetrating the second cover 110b and the flat part 161F of the roller 161 and a head portion that maintains fastening and enables manipulation of the fastening member LM with a tool, such as a screwdriver, drill bit, wrench, and the like.

In a conventional roller for a rollable display device, the roller may not have a flat part and a curved part or the roller may have a flat surface without a step. When a thin second cover is fastened with the roller using a fastening member, a head portion of the fastening member is thicker than the second cover. Thus, an upper surface of the fastening member protrudes. Accordingly, a groove or a hole may be disposed in a lower surface of a cover part seated on the flat part of the roller to accommodate the fastening member. However, if an extension sheet has a length tolerance, the fastening member may not be accurately inserted into the groove or hole of the cover part during a winding operation. If the fastening member is not accurately fastened with the groove or hole of the cover part, a grinding phenomenon may occur between the cover part and the fastening member and noise may be generated. Particularly, if the grinding phenomenon occurs, the display panel may be covered with dust from grinding of the cover part and the fastening member. Also, during repeated winding and unwinding operations, the display panel may be damaged, such as dented, scratched or broken.

Thus, in the display device 100 according to an embodiment of the present disclosure, the flat part 161F of the roller 161 is formed by two flat surfaces different in height. Therefore, the flat part 161F of the roller 161 has a step so that a grinding phenomenon between the cover part 150 and the fastening member LM may be minimized. Specifically, the flat part 161F of the roller 161 is formed by the first flat portion 161F1 at a relatively greater distance D1 from the center surface F of the roller 161 and the second flat portion 161F2 at a relatively smaller distance D2 from the center surface F of the roller 161. The second cover 110b may be fastened with the second flat portion 161F2 through the fastening member LM. If the roller 161 and the fastening structure are configured as described above, the cover part 150 may be brought into contact with only the first flat portion 161F1 during a winding operation. The cover part 150 may not be brought into contact with the second flat portion 161F2 and the fastening member LM. Therefore, in the display device 100 according to an embodiment of the present disclosure, it is possible to suppress a grinding phenomenon between the cover part 150 and the fastening member LM and suppress the generation of noise due to the structure of the flat portion 161F of the roller 161 and the display device 100 generally. As a result, the reliability of the display panel 120 is improved compared to conventional devices.

Change in Shape of Cover Part and Roller

Figure 6:
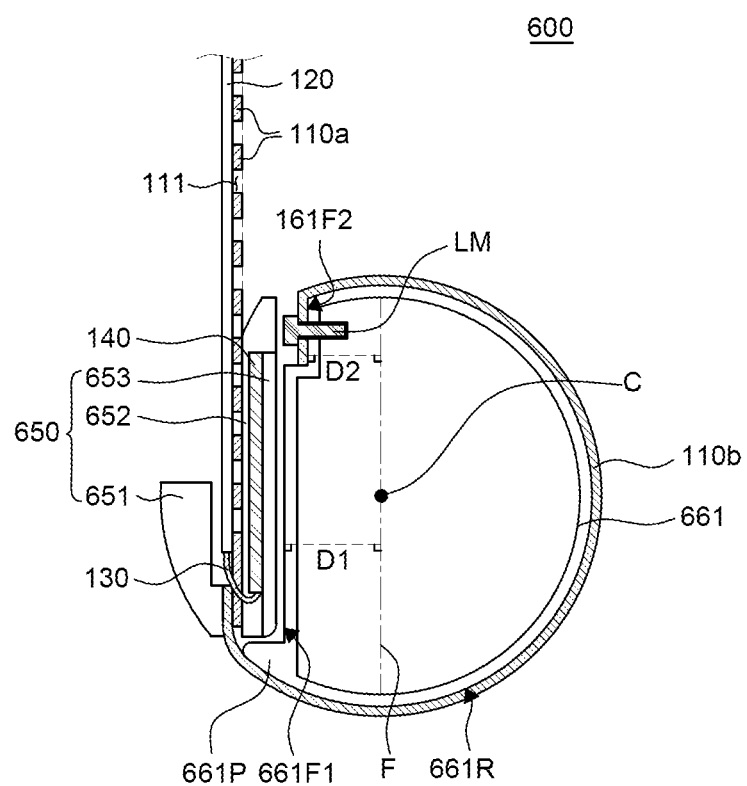
FIG. 6 is a cross-sectional view of a display device according to another embodiment of the present disclosure.

FIG. 6 is a cross-sectional view of a display device 600 according to another embodiment of the present disclosure. The display device 600 shown in FIG. 6 has substantially the same configuration as the display device 100 shown in FIG. 1 through FIG. 5C except for a change in shape of a roller 661 and a cover part 650. Thus, a repeated description will be omitted.

Referring to FIG. 6, the roller 661 of the display device 600 according to another embodiment of the present disclosure further includes a protrusion 661P protruding from a first flat portion 661F1. A surface of the protrusion 661P includes a curved surface extended from a curved part 661R of the roller and a flat surface connecting the curved surface and the first flat portion 661F1. Since the curved surface of the surface of the protrusion 661P is extended from the curved part 661R of the roller 661, the surface of the roller 661 may maintain a circular shape overall while the display part DP is wound or unwound. Since the flat surface of the surface of the protrusion 661P is connected to the flat part 661F of the roller 661, the cover part 650 may be configured to be seated on the roller 661. In other words, the protrusion 661P of the roller 661 may include a protrusion formed at an edge of the first flat portion 661F1 that is adjacent to the curved part 661R of the roller 661. The protrusion 661P has a curved outer surface that matches the curvature of the curved part 661R of the roller 661 to maintain a circular shape of the roller 661 and a flat and planar surface facing the cover part 650 to provide space for the cover part 650 to be mounted on the first flat portion 661F1 of the roller 661.

Referring to FIG. 6, one end of the cover part 650 of the display device 600 according to another embodiment of the present disclosure has a shape corresponding to the flat surface of the protrusion 661P of the roller 661. Specifically, a top cover 651, a bottom cover 652 and a base plate 653 of the cover part 650 facing the flat surface of the protrusion 661P of the roller 661 have a flat surface shape. Since the one end of the cover part 650 has a flat surface shape, it is possible to suppress damage to the cover part 650 when the cover part 650 is in contact with the flat part 661F of the roller 661 while the display part DP is wound. Further, the flat end of the cover part 650 may be spaced from the flat surface of the protrusion 661P of the roller 661 to further minimize grinding in the display device 600 during rolling and unrolling.

Hereinafter, the effect caused by the shape of the roller 661 and the cover part 650 of the display device 600 according to another embodiment of the present disclosure will be described in more detail with reference to FIG. 7A through FIG. 7C as well.

Figure 7A:
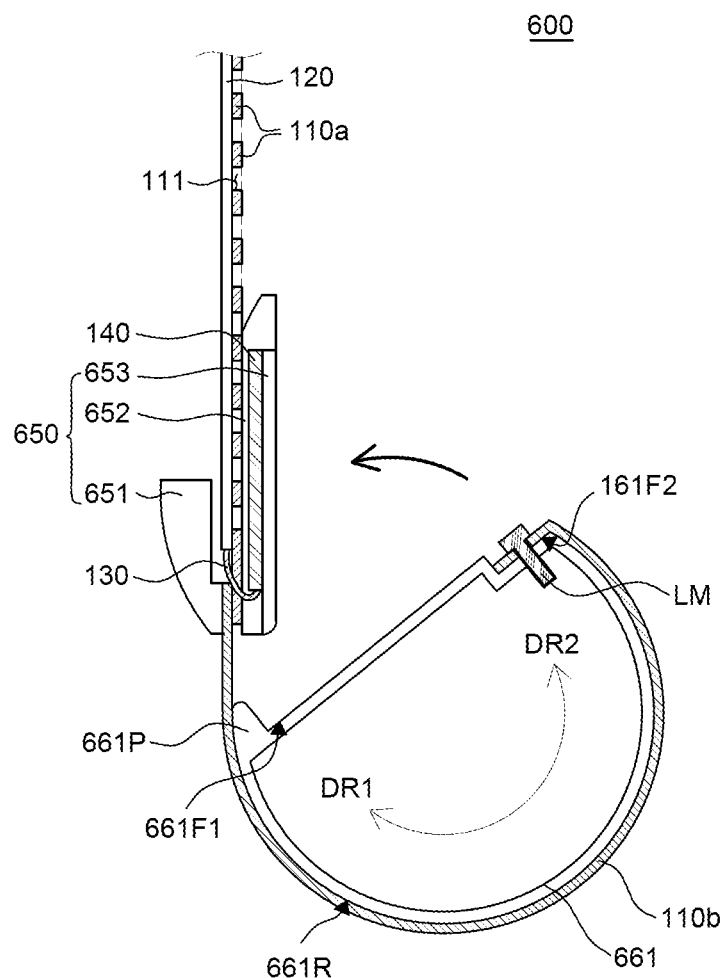
FIG. 7A through FIG. 7C are cross-sectional views illustrating a winding operation of the display device of FIG. 6 according to another embodiment of the present disclosure.
Figure 7B:
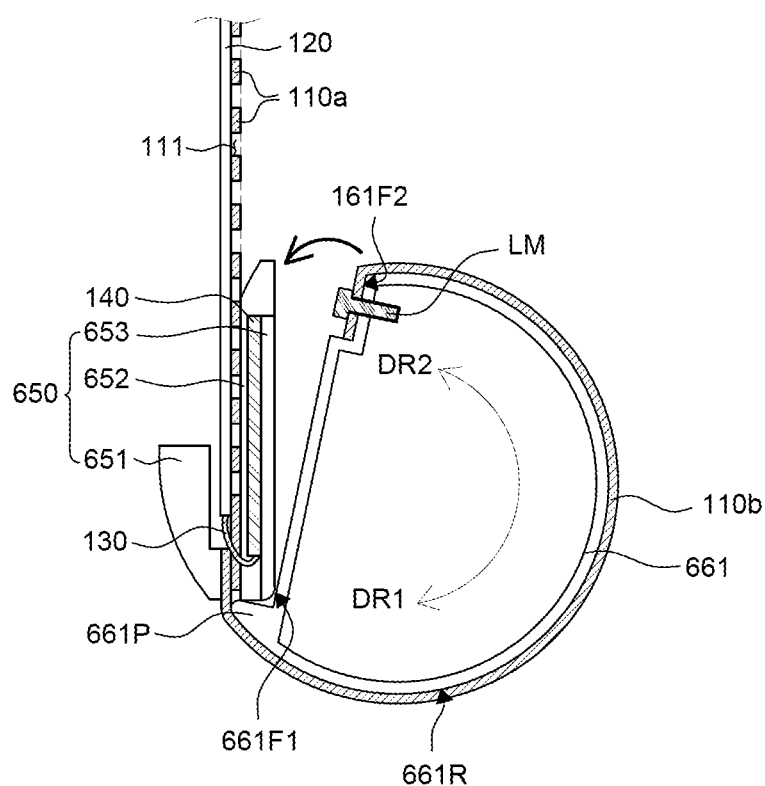
Figure 7C:
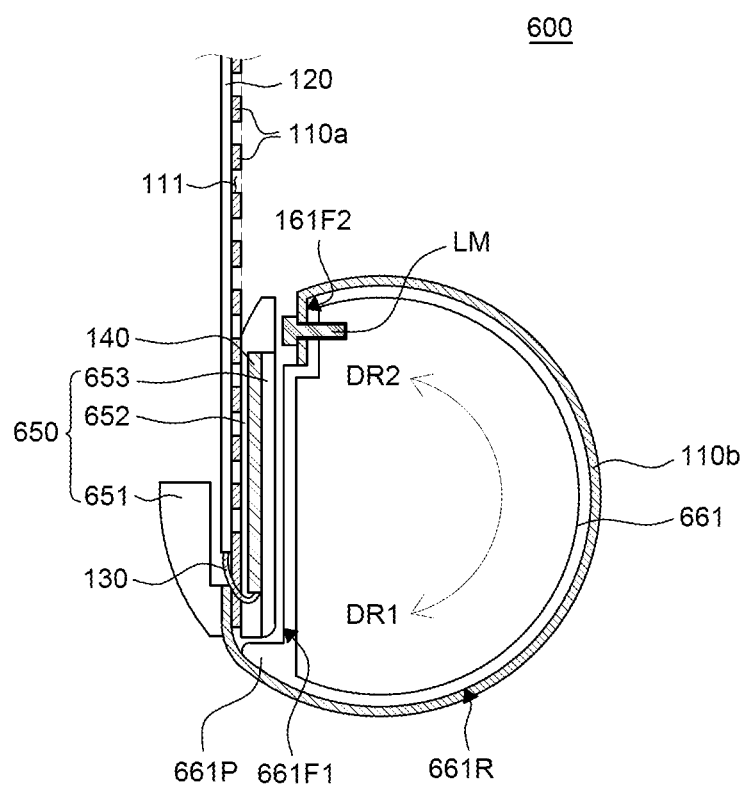

FIG. 7A through FIG. 7C are cross-sectional views for explaining a winding operation of the display device according to another embodiment of the present disclosure. That is, FIG. 7A through FIG. 7C illustrate a winding process of the display panel 120 of the display device 600 in a sequential manner.

Referring to FIG. 7A and FIG. 7B, as the display panel 120 is wound by rotating the roller 661 in the second direction DR2, i.e., counterclockwise, one end of the cover part 650 approaches the flat part 661F of the roller 661.

Then, referring to FIG. 7B and FIG. 7C, as the display panel 120 is wound by rotating the roller 661 in the second direction DR2, the cover part 650 does not make a linear contact with the roller 661. Instead, a side surface and a lower surface of the cover part 650 may make a planar contact with an upper surface of the first flat portion 661F1 of the roller 661 and the flat surface of the protrusion 661P. Also, the cover part 650 may be readily seated on the roller 661. Thus, while the protrusion 661P may assist with seating the cover part 650 on the flat part 661F of the roller 661 during an initial rolling operation as in FIG. 7B, as the roller 661 continues turning, the flat surface of the cover part 650 becomes spaced from the flat surface of the protrusion 661P of the roller 661 as in FIG. 7C with the space maintained during the remainder of the rolling process. Thus, the structure of the roller 661 and the cover part 650 minimize repeated contact or grinding of the cover part 650 against the roller 661 during movement of the roller 661.

In the display device 600 according to another embodiment of the present disclosure, the protrusion 661P is disposed at the first flat portion 661F1 of the roller 661. The one end of the cover part 650 has a shape corresponding to the flat surface of the protrusion 661P of the roller 661. Thus, it is possible to suppress abrasion caused by a linear contact between the one end of the cover part 650 and the first flat portion 661F1 of the roller 661. That is, the cover part 650 may be readily seated on the roller 661 by a planar contact of the side surface and the lower surface of the cover part 650 with the upper surface of the first flat portion 661F1 of the roller 661 and the flat surface of the protrusion 661P. In this case, it is possible to minimize a grinding phenomenon between the roller 661 and the cover part 650. Thus, in the display device 600 according to another embodiment of the present disclosure, it is possible to minimize the generation of dust from grinding of the roller 661 and the cover part 650. Also, it is possible to minimize damage to the display panel 120 caused by the generated dust.

Further, in the display device 600 according to another embodiment of the present disclosure, the protrusion 661P is disposed at the first flat portion 661F1 of the roller 661. The one end of the cover part 650 corresponds in shape to the flat surface of the protrusion 661P of the roller 661. Thus, it is possible to minimize the occurrence of creases in the display panel 120. Creases may occur in conventional display devices where there is no change in shape of the protrusion and the one end of the cover part such that the cover part is dislocated due to a length tolerance or fastening tolerance of the first cover and the second cover. If the display panel is wound in a state where the cover part is dislocated as such, creases may occur in the display panel and may be seen by the user. Accordingly, in the display device 600 according to another embodiment of the present disclosure, the protrusion 661P is disposed in the roller 661 with a flat surface and the one end of the cover part 650 has a flat shape minimize creases. Thus, it is possible to suppress the occurrence of creases in the display panel 120 according to the concepts of the present disclosure.

Protrusion of Cover Part

Figure 8:
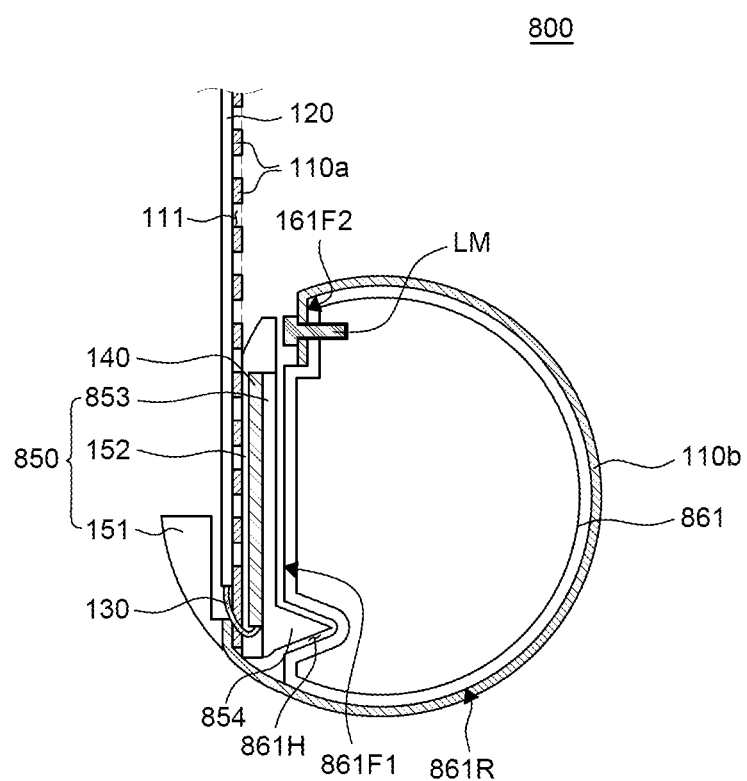
FIG. 8 is a cross-sectional view of a display device according to yet another embodiment of the present disclosure.

FIG. 8 is a cross-sectional view of a display device according to yet another embodiment of the present disclosure. A display device 800 shown in FIG. 8 has substantially the same configuration as the display device 100 shown in FIG. 1 through FIG. 5C except that a guide portion 854 of a cover part 850 and a groove 861H of a roller are further provided. Thus, a repeated description will be omitted.

Referring to FIG. 8, a roller 861 of the display device 800 according to yet another embodiment of the present disclosure further includes a groove 861H that guides a position of the cover part 850 during rolling. The groove 861H of the roller 861 is a groove extending into a first flat portion 861F1 of the roller 861 so as to correspond to a guide portion 854 of the cover part 850. FIG. 8 illustrates that a cross-sectional shape of the groove 861H is a triangular shape with the guide portion 854 having a corresponding shape, but the present disclosure is not limited thereto and the groove 861H may have any selected shape.

With continued referenced to FIG. 8, the cover part 850 of the display device 800 according to yet another embodiment of the present disclosure further includes the guide portion 854 protruding from a lower surface of the cover part 850. Specifically, the guide portion 854 may protrude from a lower surface of a base plate 853 of the cover part 850, and the base plate 853 may be formed as one singular, unitary, integral body with the guide portion 854. However, the present disclosure is not limited thereto. The guide portion 854 may be separately formed and may be fixed to the lower surface of the base plate 853. Also, the guide portion 854 may be formed as one body with another component of the cover part 850 instead of the base plate 853 or may be fixed to another component. FIG. 8 illustrates that a cross-sectional shape of the guide portion 854 is a triangular shape, but the present disclosure is not limited thereto and the guide portion 854 may have any selected shape. The guide portion 854 may correspond in shape to the groove 861H of the roller 861.

The display device 800 according to yet another embodiment of the present disclosure includes the guide portion 854 protruding from the lower surface of the cover part 850 and the groove 861H in an outer portion of the first flat portion 861F1 of the roller 861 are further disposed. Thus, the cover part 850 may be more readily seated at its regular position. While the display panel 120 is wound, the lower surface of the cover part 850 may be brought into contact with the first flat portion 861F1 of the roller 861 and the guide portion 854 and the groove 861H assist with seating the cover part 850 on the first flat portion 861F1 of the roller 861. Thus, even if the guide portion 854 of the cover part 850 is not seated at its regular position while the display panel 120 is wound, the guide portion 854 of the cover part 850 may be slid into the groove 861H in the roller 861 and thus, the guide portion 854 may be seated at a regular position of the roller 861. Therefore, the display device 800 according to yet another embodiment of the present disclosure includes the guide portion 854 protruding from the lower surface of the cover part 850 and the groove 861H dug into the first flat portion 861F1 of the roller 861 to assist with properly and accurately seating the cover part 850 on the first flat portion 861F1 of the roller 861. Thus, the cover part 850 may be more readily seated at its regular position according to the concepts of the present disclosure.

Figure 9:
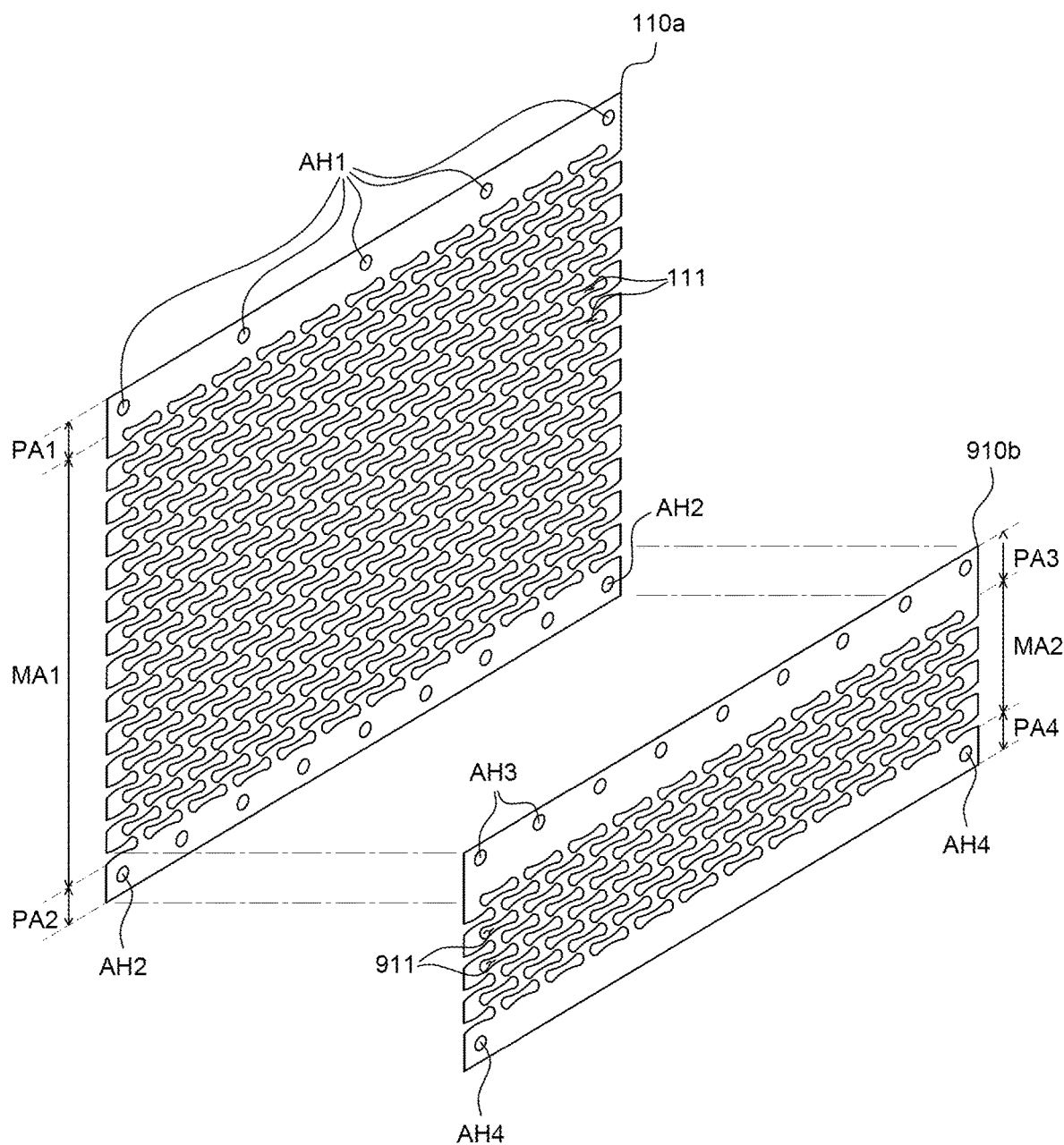
FIG. 9 is an exploded perspective view of a first cover and a second cover of a display device according to still another embodiment of the present disclosure.

FIG. 9 is an exploded perspective view of a first cover and a second cover of a display device according to still another embodiment of the present disclosure. A second cover 910b shown in FIG. 9 has substantially the same configuration as the second cover 110b shown in FIG. 1 through FIG. 5C except as otherwise described below. Thus, a repeated description will be omitted.

Referring to FIG. 9, the second cover 910b according to still another embodiment of the present disclosure may include a malleable area MA and a plurality of support areas PA3 and PA4. The second cover 910b may be made of a rigid material. Here, at least a portion of the second cover 910b may be flexible to be wound or unwound along with the display panel. For example, the second cover 910b may be made of a metallic material such as Steel Use Stainless SUS or Invar, or plastic, but is not limited thereto. The material of the second cover 910b may vary depending on design factors, such as the amount of thermal deformation, a radius of curvature, rigidity, and the like in some non-limiting examples.

The second cover 910b includes the malleable area MA2 and the plurality of support areas PA3 and PA4. The plurality of support areas PA3 and PA4 are areas in which a plurality of openings 911 is not disposed, and the malleable area MA2 of the second cover 910b is an area in which the plurality of openings 911 is disposed. Specifically, the second cover 910b includes the third support area PA3, the malleable area MA2 and the fourth support area PA4 which are disposed in sequence from the uppermost end of the second cover 910b to a lowermost end of the second cover 910b. Herein, the second cover 910b is wound or unwound in the column or vertical direction, and, thus, the plurality of support areas PA3 and PA4 and the malleable area MA2 may be disposed along the column direction.

When the display part is wound or unwound, the plurality of openings 911 disposed in the malleable area MA2 of the second cover 910b may be deformed by stress which is applied to the display part. Specifically, when the display part is wound or unwound, the malleable area MA2 of the second cover 910b may be deformed as the plurality of openings 911 is contracted or expanded. Further, as the plurality of openings 911 is contracted or expanded, a slip phenomenon of the display panel disposed on the malleable area MA2 of the second cover 910b is minimized. Thus, the stress applied to the display panel may be minimized.

Change in Second Cover

Figure 10A:
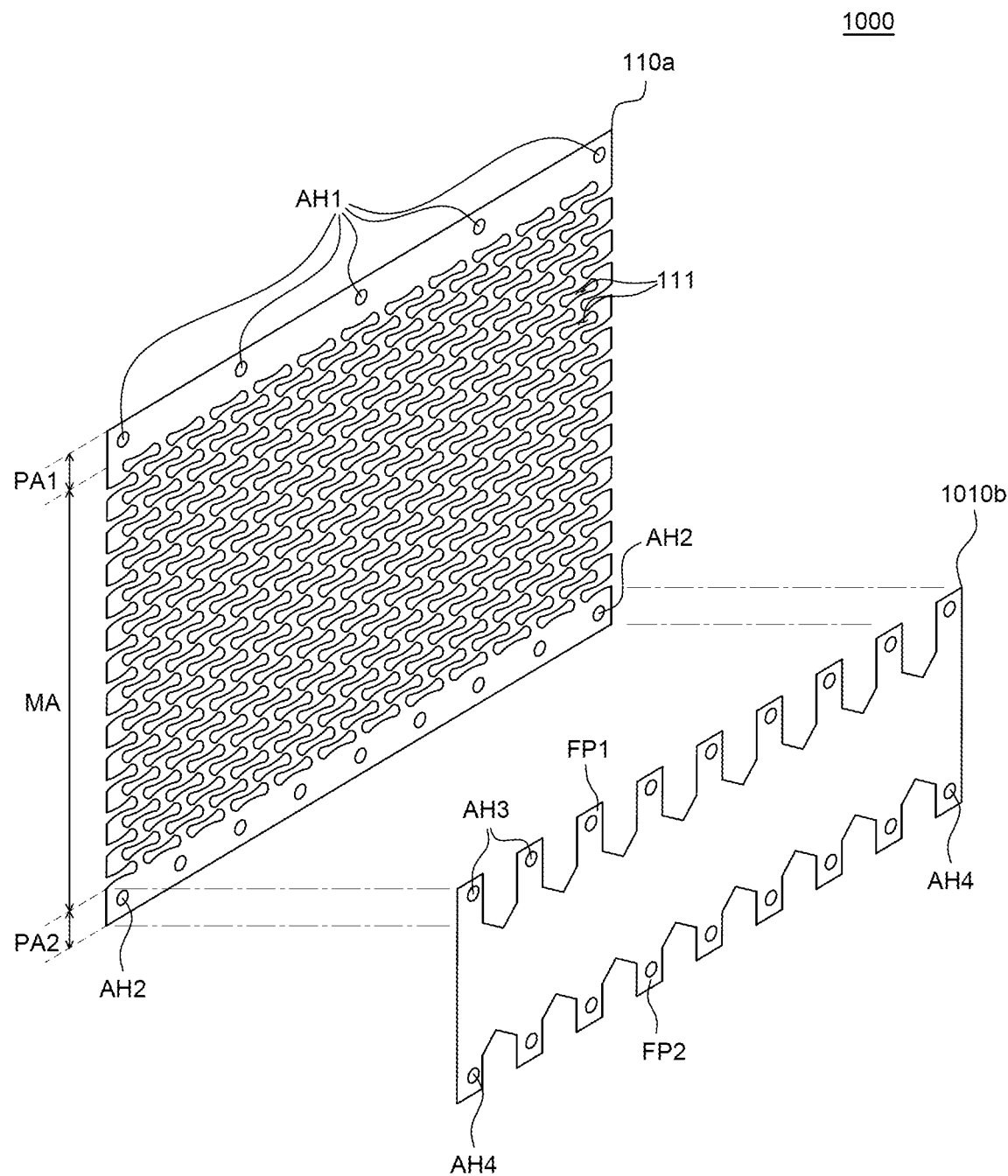
FIG. 10A is an exploded perspective view of a first cover and a second cover of a display device according to still another embodiment of the present disclosure.
Figure 10B:
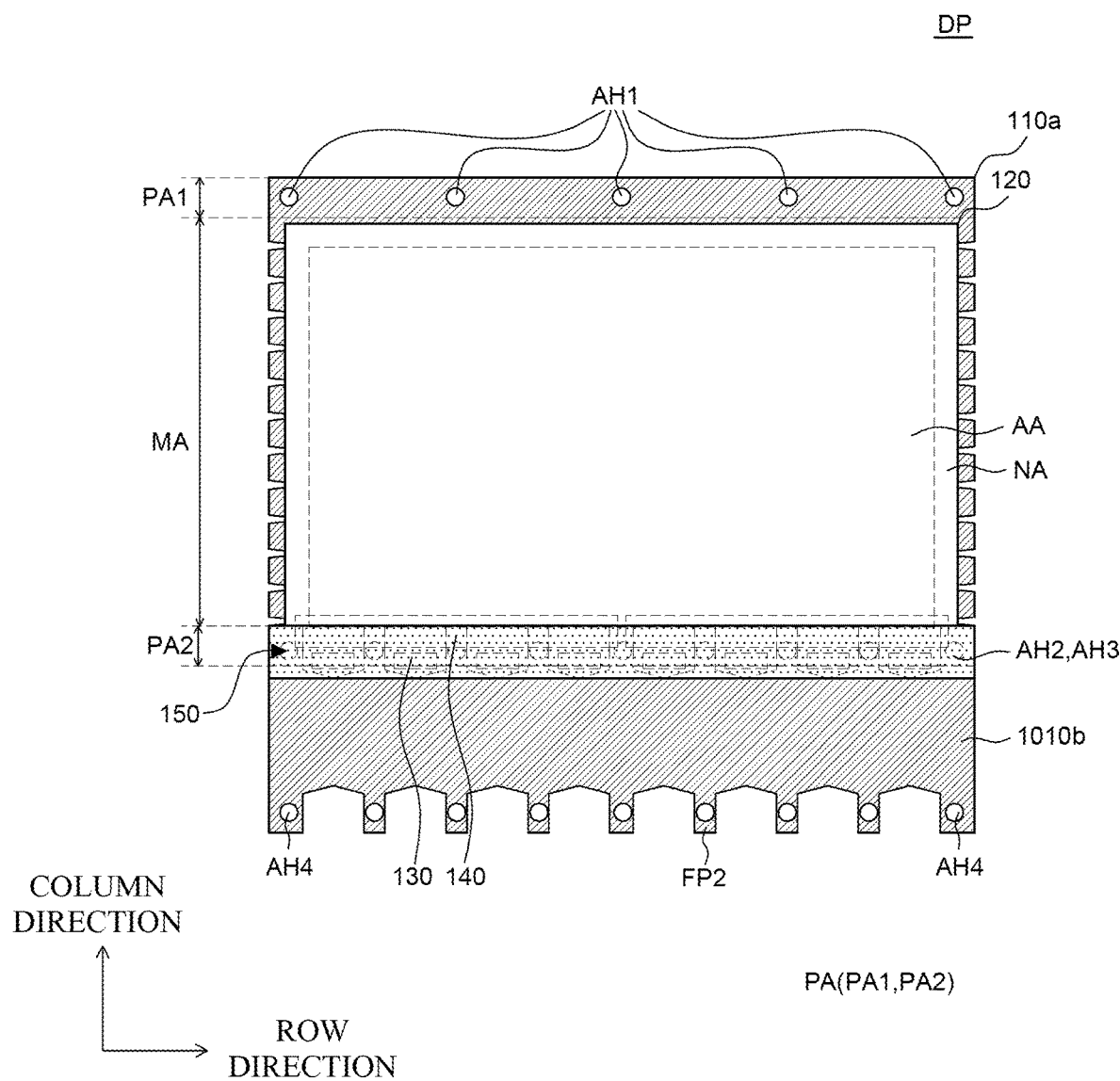
FIG. 10B is an elevational view of a display part of the display device of FIG. 10A according to still another embodiment of the present disclosure.

FIG. 10A is an exploded perspective view for explaining a first cover and a second cover of a display device 1000 according to still another embodiment of the present disclosure. FIG. 10B is an elevational view of a display part DP of the display device 1000 according to still another embodiment of the present disclosure. A second cover 1010b of the display device 1000 shown in FIG. 10A and FIG. 10B has substantially the same configuration as the second cover 110b of the display device 100 shown in FIG. 1 through FIG. 5C except for a partial change in shape as described in more detail below. Thus, a repeated description will be omitted.

Referring to FIG. 10A and FIG. 10B, the other end or lower end of the second cover 110b is the lowermost portion of the second cover 110b that is fastened with the roller 161. The second cover 1010b may include a plurality of second fastening parts FP2 that overlaps the roller 161. The plurality of second fastening parts FP2 are disposed at the other end or bottom end of the second cover 1010b. Also, the plurality of second fastening parts FP2 may include a plurality of fourth fastening holes AH4 structured to receive fasteners to couple the second cover 1010b with the roller 161. The plurality of second fastening parts FP2 including the plurality of fourth fastening holes AH4 are spaced apart from each other. Further, the plurality of second fastening parts FP2 may be aligned with, or offset from, the plurality of first fastening parts FP1 at the upper end of the second cover 1010b. The display device 1000 may include the same or a different number of first fastening parts FP1 and second fastening parts FP2 with each of the first and second fastening parts FP1, FP2 having the same or a different shape. Each second fastening part FP2 may also include only one fourth fastening hole AH4 or each second fastening part FP2 may include more than one fourth fastening hole AH4 in some embodiments. Also, a space where a cover guide portion 1261G to be described later is disposed may be formed between the plurality of second fastening parts FP2. Although nine fourth fastening holes AH4 are illustrated in FIG. 10A, the number of fourth fastening holes AH4 is illustrative and is not limited thereto.

Cover Guide Portion

Figure 11A:
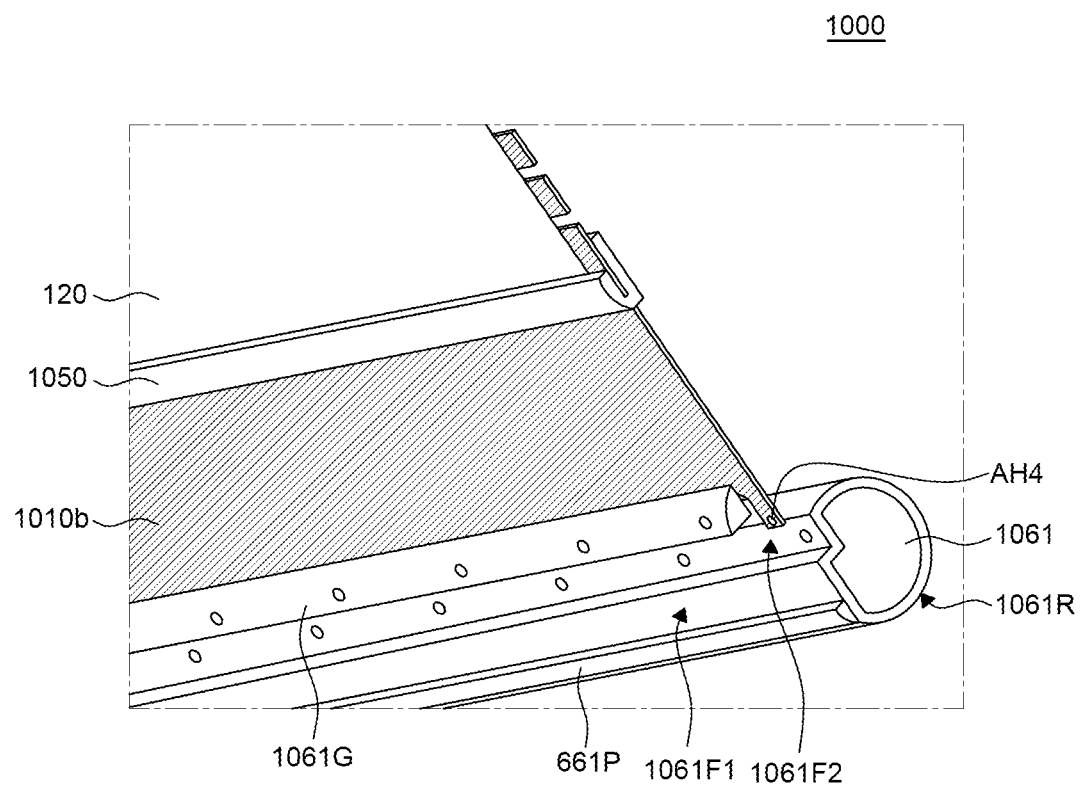
FIG. 11A is a perspective view of the display device of FIG. 10A according to still another embodiment of the present disclosure.
Figure 11B:
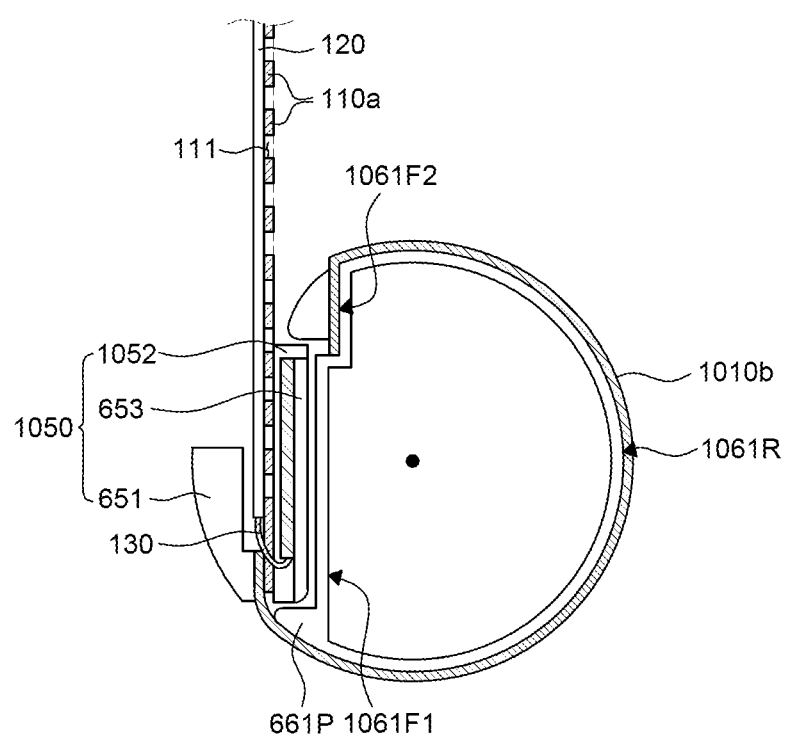
FIG. 11B is a cross-sectional view of the display device of FIG. 11A wound around a roller.

FIG. 11A is a perspective view of the display device 1000 according to still another embodiment of the present disclosure. FIG. 11B is a cross-sectional view of the display device 1000 of FIG. 11A in an wound state.

The display device 1000 shown in FIG. 11A and FIG. 11B has substantially the same configuration as the display device 600 shown in FIG. 6 except for a cover part 1050 and a roller 1061. Thus, a repeated description will be omitted.

Referring to FIG. 11A and FIG. 11B, the roller 1061 of the display device 1000 according to still another embodiment of the present disclosure further includes a cover guide portion 1061G disposed on a second flat part 1061F2 of the roller 1061.

The cover guide portion 1061G and the roller 1061 may be separately formed with the cover guide portion 1061G coupled to the roller 1061 with a fastener or adhesive. That is, the cover guide portion 1061G and the second flat part 1061F2 include a plurality of fastening holes corresponding to the plurality of fourth fastening holes AH4 in the second cover 1010b. Also, a plurality of fastening members LM may penetrate the cover guide portion 1061G, the second cover 1010*b* and the second flat part 1061F2 of the roller 1061 through the plurality of fourth fastening holes AH4 and the plurality of fastening holes in the cover guide portion 1061G and fix the cover guide portion 1061G and the second cover 1010*b* to the roller 1061.

A surface of the cover guide portion 1061G includes a curved surface corresponding to a curved part 1061R of the roller 1061, a lower flat surface facing the curved surface and a second flat part 1061F2 of the roller 1061, and a side flat surface connecting the curved surface and the lower flat surface. The curved surface of the surface of the cover guide portion 1061G partially corresponds in shape to a curved surface extending from the curved part 1061R of the roller 1061 and may have the same or a similar radius of curvature as the curved part 1061R of the roller 1061. Thus, the surface of the roller 1061 may maintain a circular shape overall while the display part DP is wound or unwound. Since the lower flat surface of the cover guide portion 1061G is disposed to face the second flat part 1061F2 of the roller 661, the cover part 1050 may be seated on the roller 661 and the second cover 1010*b* may also be fixed.

Referring to FIG. 11B, one end of the cover part 1050 of the display device 1000 according to still another embodiment of the present disclosure corresponds in shape to the flat surface of the protrusion 661P of the roller 1061. Also, the other end of the cover part 1050 corresponds in shape to the side flat surface of the cover guide portion 1061G of the roller 1061. When the display part DP is fully wound, the cover part 1050 may be seated between the protrusion 661P and the cover guide portion 1061G. Specifically, a side surface of one end of the cover part 1050 may be disposed to be in contact with or adjacent to the flat surface of the protrusion 661P. Also, a lower surface of the cover part 1050 may be in contact with an upper surface of a first flat part 1061F1. Further, a side surface of the other end of the cover part 1050 may face the side flat surface of the cover guide portion 1061G and may be disposed to be spaced apart at a minimum distance from the side flat surface of the cover guide portion 1061G. Here, the minimum distance may be preferably greater than a processing tolerance of the second cover 1010*b*, a processing tolerance of the cover part 1050 and a fastening tolerance between the second cover 1010*b* and the cover part 1050.

In the conventional rollable display device, a roller used to wind a display panel may not include a flat surface or may have a flat part and a curved part. An extension sheet connecting the display panel and the roller may have a length tolerance by which the extension sheet is manufactured longer than the design or a fastening tolerance by which the extension sheet is connected to the display panel or the roller at a slightly different position from a designed position. However, conventional rollable display devices do not include a structure for seating a cover part on the flat part of a roller while the extension sheet having a length tolerance or a fastening tolerance as described above is wound. Thus, the cover part may be dislocated and the display panel may not be rolled in circle. In this case, when the rollable display device is wound, the cover part is not disposed at a regular position on the flat part of the roller. Thus, the extension sheet may be creased or folded on the curved part of the roller. Therefore, the display panel may also be damaged.

In the display device 1000 according to still another embodiment of the present disclosure, the cover guide portion 1061G and the protrusion 661P are disposed at both ends of the first and second flat parts 1061F1 and 1061F2 of the roller 1061 while the display part DP is wound. Thus, the cover part 1050 may be seated at a regular position on the first flat part 1061F1 of the roller. Also, since the cover part 1050 is seated at the regular position, the first cover 110*a* and the second cover 1010*b* can be rolled in circle along the curved surface 1061R of the roller 1061 when the display part DP is wound. Therefore, in the display device 1000 according to still another embodiment of the present disclosure, even if there is a length tolerance or fastening tolerance between the first cover 110*a* and the second cover 1010*b*, it is possible to minimize damage caused by creases or folding of the display panel 120 while being wound.

Change in Shape of Cover Guide Portion

Figure 12A:
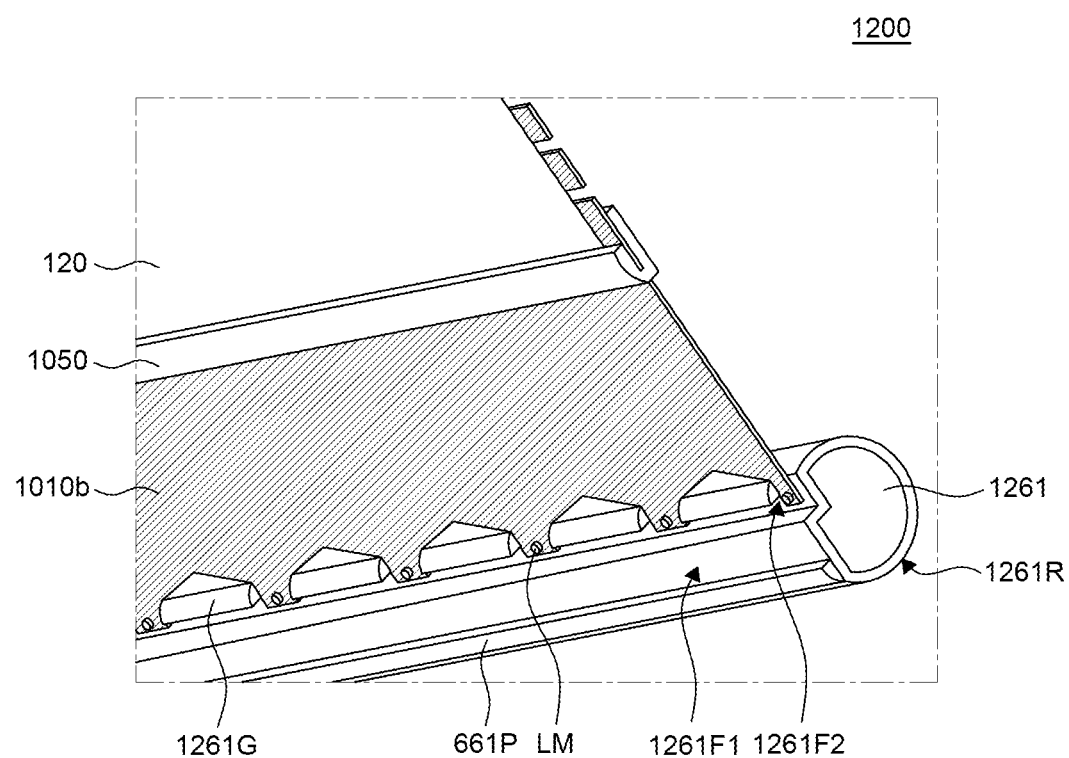
FIG. 12A is a perspective view of a display device according to still another embodiment of the present disclosure.
Figure 12B:
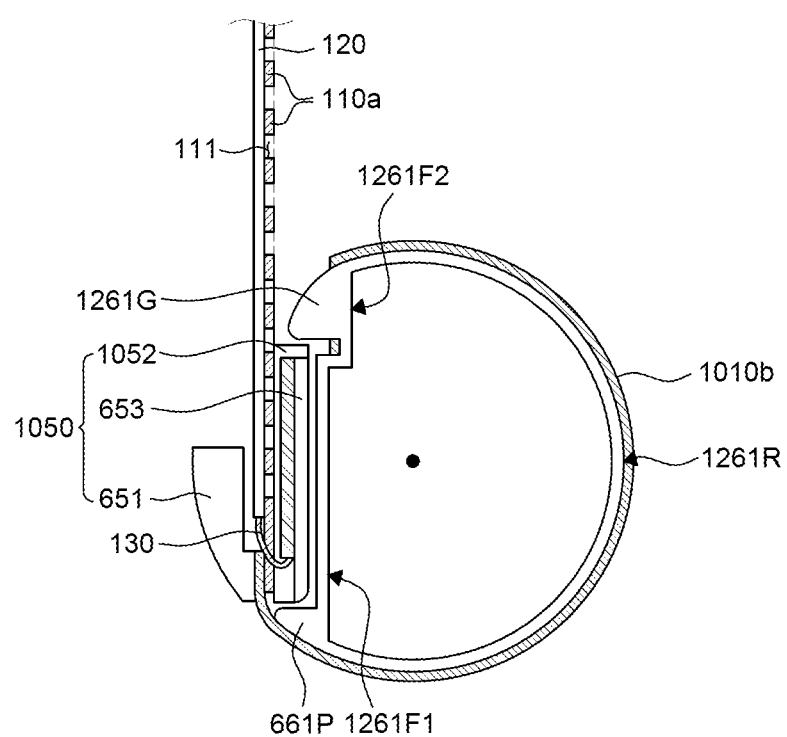
FIG. 12B is a cross-sectional view of the display device of FIG. 12A wound around a roller.

FIG. 12A is a perspective view of a display device 1200 according to still another embodiment of the present disclosure. FIG. 12B is a cross-sectional view of the display device 1200 of FIG. 12A in a wound state or configuration. The display device 1200 shown in FIG. 12A and FIG. 12B has substantially the same configuration as the display device 1000 shown in FIG. 11A and FIG. 11B except for a shape of the cover guide portion 1261G. Thus, a repeated description will be omitted.

Referring to FIG. 12A and FIG. 12B, a roller 1261 of the display device 1200 according to still another embodiment of the present disclosure further includes a plurality of cover guide portions 1261G disposed on a second flat part 1261F2 of the roller 1261. The plurality of cover guide portions 1261G may be formed as one singular, unitary, integral body with the roller 1261 or may be separate components coupled to the roller 1261.

A surface of each of the plurality of cover guide portions 1261G includes a curved surface extending from a curved part 1261R of the roller 1261 and a flat surface connecting the curved surface of the cover guide portions 1261G and a second flat part 1261F2 of the roller 1261. Since the curved surface of the surface of the cover guide portion 1261G extends from the curved part 1261R of the roller 1261, the surface of the roller 1261 may maintain a circular shape overall while the display part DP is wound or unwound to minimize damage to the display part DP. Since the flat surface of the surface of the cover guide portion 1261G is connected to the second flat part 1261F2 of the roller 1261, the cover part 1050 may be configured to be seated on the roller 1261.

Referring to FIG. 10A, FIG. 10B, FIG. 12A and FIG. 12B, the plurality of second fastening parts FP2 of the second cover 1010*b* may be fixed to the second flat part 1261F2 of the roller 1261 through the plurality of fourth fastening holes AH4 and the fastening members LM. Each of the plurality of cover guide portions 1261G may be disposed on the second flat part 1261F2 of the roller 1261 between the plurality of second fastening parts FP2 and adjacent to the plurality of second fastening parts FP2.

In the display device 1200 according to still another embodiment of the present disclosure, the cover guide portion 1061G and the protrusion 661P are disposed at both ends of the first and second flat parts 1061F1 and 1061F2 of the roller 1261 while the display part DP is wound. Thus, the cover part 1050 may be seated at a regular position on the first flat part 1061F1 of the roller. Accordingly, the display panel 120 can be rolled in circle along the curved surface of the roller 1261 without creases regardless of a length tolerance or fastening tolerance between the first cover 110*a* and the second cover 1010*b*. Therefore, it is possible to minimize damage to the display panel 120.

Curved Part of Roller

Figure 13A:
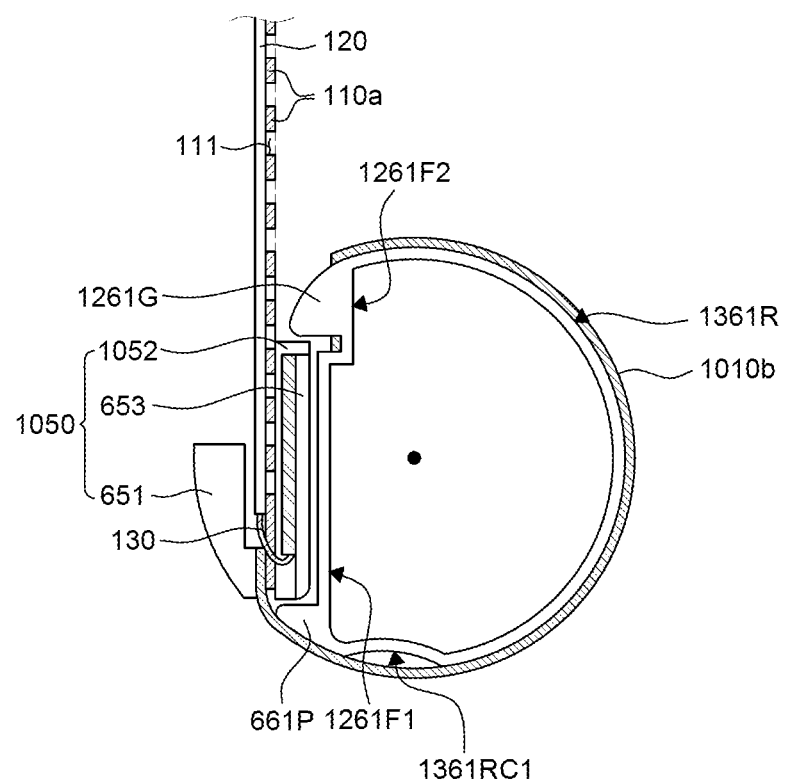
FIG. 13A is a cross-sectional view of a display device according to still another embodiment of the present disclosure.
Figure 13B:
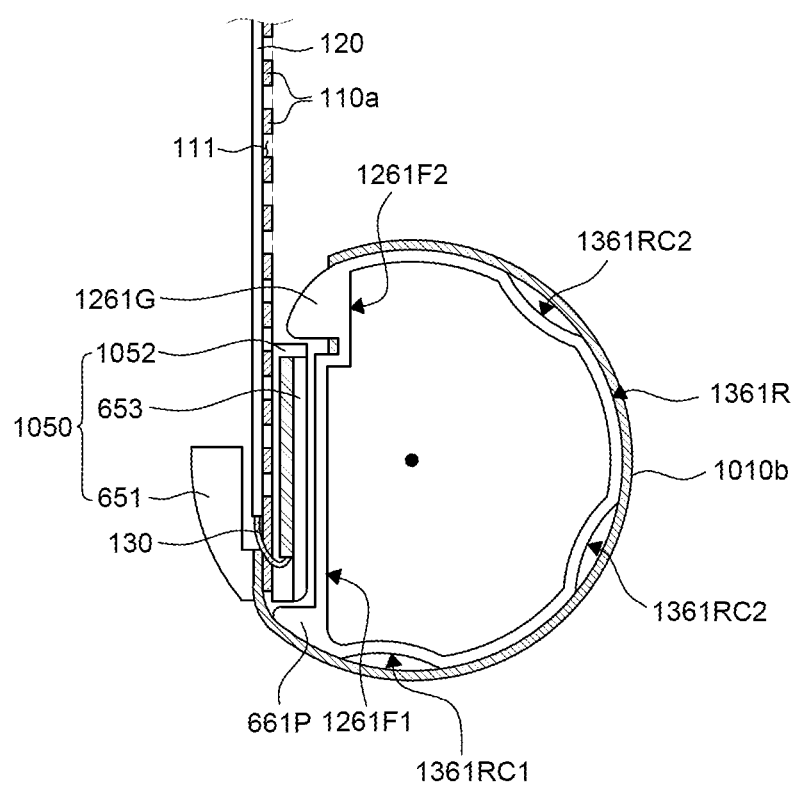
FIG. 13B is a cross-sectional view of the display device of FIG. 13A according to still another embodiment of the present disclosure.

FIG. 13A is a cross-sectional view of a display device 1300 according to still another embodiment of the present disclosure. FIG. 13B is a cross-sectional view of the display device 1300 according to still another embodiment of the present disclosure.

The display device 1300 shown in FIG. 13A and FIG. 13B has substantially the same configuration as the display device 1000 shown in FIG. 11A and FIG. 11B except for a shape of a curved part 1361R of the roller. Thus, a repeated description will be omitted.

Referring to FIG. 13A, a roller 1361 may include a curved part 1361R and a flat part 1061F. The curved part 1361R may further have a first recess 1361RC1. Specifically, when the second cover 1010b is wound around the roller 1361, creases may occur in display panel 120 at the curved part 1361R of the roller adjacent to the protrusion 661P. Thus, in order to reduce the likelihood occurrence of creases, the first recess 1361RC1 may be disposed between the protrusion 661P and the cover guide portion 1061G so as to be adjacent to the protrusion 661P. Referring to FIG. 13B, the roller 1361 may further have a second recess 1361RC2 in addition to the first recess 1361RC1.

For example, the first recess 1361RC1 and the second recess 1361RC2 may be added to the roller 1061 shown in FIG. 11A and FIG. 11B, but the present disclosure is not limited thereto. The first recess 1361RC1 and the second recess 1361RC2 may also be applied to the display device 100 shown in FIG. 5C, the display device 600 shown in FIG. 6, the display device 800 shown in FIG. 8 and the display device 1200 shown in FIG. 12A and FIG. 12B.

In a conventional rollable display device, the roller is designed to have a smooth outer curved surface without a recess. In the conventional rollable display device, creases may occur on the curved part of the roller when the first cover 110a is wound on the roller due to the length tolerance of the first cover 110a. The second cover is also wound on the first cover. Thus, creases may occur in the display panel and may be seen by the user.

In the display device 1300 according to still another embodiment of the present disclosure, the first recess 1361RC1 or the second recess 1361RC2, or both, is disposed in the curved part 1361R of the roller. Thus, it is possible to suppress the occurrence of creases in the display panel 120. Also, it is possible to reduce the visibility of creases from the outside and also possible to suppress damage to the display panel.

In view of the above, the embodiments of the present disclosure can be described as follows.

According to an embodiment of the present disclosure, the display device may include a display panel, a first cover supporting a rear surface of the display panel and a second cover whose one end is connected to the first cover. The display device also includes a roller to which the other end of the second cover is fixed and which is configured to wind or unwind the display panel. The display device further includes a fastening member configured to fix the other end of the second cover to the roller. The roller includes a flat part and a curved part, and the flat part includes a first flat portion and a second flat portion that is closer to a center surface of the roller than the first flat portion. The fastening member is disposed on the second flat portion.

The upper surface of the fastening member may be located at a position equal to or lower than an upper surface of the first flat portion.

The display device may further include a plurality of flexible films electrically connected to the display panel; a printed circuit board electrically connected to the plurality of flexible films; and a cover part that accommodates the printed circuit board and connects the first cover and the second cover.

The roller may further include a protrusion protruding from the first flat portion, and a surface of the protrusion includes a curved surface extended from the curved part and a flat surface connecting the curved surface and the first flat portion.

One end of the cover part may correspond in shape to the flat surface of the protrusion.

The cover part may include: a base plate; a bottom cover disposed between the base plate and the first cover; and a top cover disposed on the bottom cover, and the printed circuit board is accommodated between the bottom cover and the base plate, and a surface of the bottom cover has a flat surface shape corresponding to the flat surface of the protrusion.

The upper surface of the top cover may have a curved surface shape corresponding to the curved surface of the protrusion.

The second cover may be disposed between the first cover and the top cover, and the first cover and the second cover are fastened by a fixing member that penetrates the top cover, the second cover, the first cover, the bottom cover and the base plate.

The second cover may include a plurality of first fastening parts that overlaps the first cover, and the plurality of flexible films is bent through a space between the plurality of first fastening parts.

The cover part may further include a guide portion protruding from a lower surface of the cover part, and the roller may further include a groove dug into the first flat portion so as to correspond to the guide portion.

The roller may further include a cover guide portion disposed on the second flat part, and a surface of the cover guide portion includes a curved surface corresponding to the curved part.

The cover guide portion may overlap the second flat part and the second cover.

The cover guide portion may include a plurality of cover guide portions, and the fastening member may include a plurality of fastening members, and the second cover may include a plurality of second fastening parts fixed to the second flat part, and the plurality of cover guide portions may be disposed between the plurality of second fastening parts fixed by the plurality of fastening members.

The cover guide portion may be provided as one body with the roller.

When the display panel is wound, the cover part may be disposed between the protrusion and the cover guide portion.

The roller may include a first recess disposed in the curved part.

The first recess may be disposed between the protrusion and the cover guide portion so as to be adjacent to the protrusion.

According to another embodiment of the present disclosure, the display device may include a display panel configured to display images and a first cover attached to the display panel. The display device also includes a roller including a flat part and a curved part, including a first flat portion and a second flat portion located further inside the roller than the first flat portion, and configured to wind or unwind the display panel and the first cover. The display device further includes a second cover configured to connect the first cover and the roller, and a fastening member configured to fix the second cover to the roller on the second flat portion.

The display device may further include a cover part connecting the first cover and the second cover; a printed circuit board accommodated in the cover part; and a plurality of flexible films that electrically connects the display panel and the printed circuit board.

When the display panel may be fully wound, the cover part may be spaced apart from the fastening member.

The roller may further include a protrusion protruding from the first flat portion, and the protrusion may include a curved surface extended from the curved part and a flat surface facing the cover part.

The cover part facing the protrusion may have a flat surface corresponding to the flat surface of the protrusion.

The cover part may include: a bottom cover disposed on a rear surface of the first cover and including the printed circuit board on its rear surface; a base plate located on a rear surface of the printed circuit board and overlapping the bottom cover; and a top cover extended from the bottom cover and covering one end of the first cover, and a surface of the bottom cover has a flat surface shape corresponding to the flat surface of the protrusion of the roller.

The roller may further include a groove dug into the first flat portion, and the cover part may further include a guide portion protruding from a lower surface of the cover part so as to correspond to the groove of the roller.

The roller may further include a cover guide portion disposed on the second flat part, and a surface of the cover guide portion may include a curved surface corresponding to the curved part.

The cover guide portion may overlap the second flat part and the second cover.

The cover guide portion includes a plurality of cover guide portions, and the fastening member includes a plurality of fastening members, and the second cover includes a plurality of second fastening parts fixed to the second flat part, and the plurality of cover guide portions may be disposed between the plurality of second fastening parts fixed by the plurality of fastening members.

The cover guide portion may be provided as one body with the roller.

The roller may include a first recess disposed in the curved part.

According to a further embodiment of the present disclosure, a display device may include: a display panel; a first cover configured to support a rear surface of the display panel; a second cover having a first end coupled to the first cover; a roller configured to wind or unwind the display panel, a second end of the second cover coupled to the roller; and a fastening member configured to couple the second end of the second cover to the roller, wherein the roller includes a flat part and a curved part, and the flat part of the roller includes a first flat portion and a second flat portion, the second flat portion being closer to a center surface of the roller than the first flat portion, and the fastening member is disposed on the second flat portion of the flat part of the roller.

An upper surface of the fastening member may be located at a position equal to or lower than an upper surface of the first flat portion relative to the center surface of the roller.

The display device may further include: a plurality of flexible films electrically connected to the display panel; a printed circuit board electrically connected to the plurality of flexible films; and a cover assembly that accommodates the printed circuit board, the cover assembly coupled to the first cover and to the second cover.

The roller may further include a protrusion extending from the first flat portion of the roller, and a surface of the protrusion includes a curved surface extending from the curved part of the roller and a flat surface connecting the curved surface of the protrusion and the first flat portion of the roller.

A first end of the cover assembly may have a shape corresponding to the flat surface of the protrusion.

The cover assembly may include: a base plate; a bottom cover disposed between the base plate and the first cover; and a top cover disposed on the bottom cover, the printed circuit board being accommodated between the bottom cover and the base plate of the cover assembly, and a surface of the bottom cover of the cover assembly has a flat surface shape corresponding to the flat surface of the protrusion.

An upper surface of the top cover of the cover assembly may have a curved surface shape corresponding to the curved surface of the protrusion.

The second cover may be disposed between the first cover and the top cover of the cover assembly, and the first cover and the second cover may be coupled to each other by a fastener that penetrates the top cover, the second cover, the first cover, the bottom cover and the base plate.

The second cover may include a plurality of fastening parts that overlap the first cover, and the plurality of flexible films is bent through a space between the plurality of fastening parts.

The cover assembly may further include a guide portion protruding from a lower surface of the cover assembly, and the roller may further include a groove in the first flat portion of the roller corresponding to the guide portion of the cover assembly.

The roller further may further include a cover guide portion disposed on the second flat part of the roller, and a surface of the cover guide portion may include a curved surface corresponding to the curved part of the roller.

The cover guide portion may overlap the second flat part of the roller and the second cover.

The cover guide portion may be one of a plurality of cover guide portions, and the fastening member may be one of a plurality of fastening members, and the second cover may include a plurality of fastening parts coupled to the second flat portion of the roller with the plurality of cover guide portions disposed between the plurality of fastening parts with the plurality of cover guide portions coupled to the plurality of fastening parts of the second cover by the plurality of fastening members.

The cover guide portion may be part of the roller as one singular body with the roller.

The cover assembly may be disposed between the protrusion and the cover guide portion in response to the display panel being in a wound configuration around the roller.

The roller may include a first recess disposed in the curved part of the roller.

The first recess may be disposed between the protrusion and the cover guide portion, the first recess being adjacent to the protrusion.

The roller may further include a second recess disposed between the first recess and the cover guide portion in the curved part of the roller.

According to another embodiment of the present disclosure, a display device may include: a display panel configured to display images; a first cover coupled to the display panel; a roller including a flat part and a curved part, the flat part of the roller including a first flat portion and a second flat portion located further inside the roller than the first flat portion, the roller configured to wind or unwind the display panel and the first cover; a second cover configured to couple the first cover to the roller; and a fastening member configured to couple the second cover to the roller at the second flat portion of the roller.

The display device may further include: a cover part coupled to the first cover and to the second cover; a printed circuit board accommodated in the cover part; and a plurality of flexible films that electrically connect the display panel and the printed circuit board.

The cover part may be spaced apart from the fastening member in response to the display panel being fully wound around the roller.

The roller may further include a protrusion extending from the first flat portion of the roller, and the protrusion may include a curved surface extending from the curved part of the roller and a flat surface facing a portion of the cover part.

The portion of the cover part facing the protrusion may have a flat surface corresponding to the flat surface of the protrusion.

The cover part may further include: a bottom cover disposed on a rear surface of the first cover, the printed circuit board disposed on a rear surface of the bottom cover; a base plate located on a rear surface of the printed circuit board, the base plate overlapping the bottom cover; and a top cover extending from the bottom cover and covering one end of the first cover, and a surface of the bottom cover having a flat surface shape corresponding to the flat surface of the protrusion of the roller.

The roller may further include a groove in the first flat portion of the roller, and the cover part may further include a guide portion protruding from a lower surface of the cover part corresponding to the groove of the roller.

The roller may further include a cover guide portion disposed on the second flat portion of the roller, and a surface of the cover guide portion may include a curved surface corresponding to the curved part of the roller.

The cover guide portion may overlap the second flat portion of the roller and the second cover.

The cover guide portion may be one of a plurality of cover guide portions, and the fastening member may be one of a plurality of fastening members, and the second cover may include a plurality of fastening parts coupled to the second flat portion of the roller with the plurality of cover guide portions disposed between the plurality of fastening parts of the second cover, the plurality of cover guide portions coupled to the plurality of fastening parts of the second cover by the plurality of fastening members.

The cover guide portion may be part of the roller as one singular body with the roller.

The roller may include a first recess disposed in the curved part of the roller.

Although the embodiments of the present disclosure have been described in detail with reference to the accompanying drawings, the present disclosure is not limited thereto and may be embodied in many different forms without departing from the technical concept of the present disclosure. Therefore, the embodiments of the present disclosure are provided for illustrative purposes only but not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

The invention claimed is:

1. A display device, comprising:
   a display panel;
   a first cover configured to support a rear surface of the display panel;
   a second cover having a first end coupled to the first cover;
   a roller configured to wind or unwind the display panel, a second end of the second cover coupled to the roller; and
   a fastening member configured to couple the second end of the second cover to the roller,
   wherein the roller includes a flat part and a curved part,
   the flat part of the roller includes a first flat portion and a second flat portion, the second flat portion being closer to a center surface of the roller than the first flat portion, and
   the fastening member is disposed on the second flat portion of the flat part of the roller.

2. The display device according to claim 1, wherein an upper surface of the fastening member is located at a position equal to or lower than an upper surface of the first flat portion relative to the center surface of the roller.

3. The display device according to claim 1, further comprising:
   a plurality of flexible films electrically connected to the display panel;
   a printed circuit board electrically connected to the plurality of flexible films; and
   a cover assembly that accommodates the printed circuit board, the cover assembly coupled to the first cover and to the second cover.

4. The display device according to claim 3, wherein the roller further includes a protrusion extending from the first flat portion of the roller, and
   a surface of the protrusion includes a curved surface extending from the curved part of the roller and a flat surface connecting the curved surface of the protrusion and the first flat portion of the roller.

5. The display device according to claim 4, wherein a first end of the cover assembly has a shape corresponding to the flat surface of the protrusion.

6. The display device according to claim 5, wherein the cover assembly includes:
   a base plate;
   a bottom cover disposed between the base plate and the first cover; and
   a top cover disposed on the bottom cover,
   the printed circuit board being accommodated between the bottom cover and the base plate of the cover assembly, and
   a surface of the bottom cover of the cover assembly has a flat surface shape corresponding to the flat surface of the protrusion.

7. The display device according to claim 6, wherein an upper surface of the top cover of the cover assembly has a curved surface shape corresponding to the curved surface of the protrusion.

8. The display device according to claim 6, wherein the second cover is disposed between the first cover and the top cover of the cover assembly, and the first cover and the second cover are coupled to each other by a fastener that penetrates the top cover, the second cover, the first cover, the bottom cover and the base plate.

9. The display device according to claim 6, wherein the second cover includes a plurality of fastening parts that overlap the first cover, and
the plurality of flexible films is bent through a space between the plurality of fastening parts.

10. The display device according to claim 3, wherein the cover assembly further includes a guide portion protruding from a lower surface of the cover assembly, and
the roller further includes a groove in the first flat portion of the roller corresponding to the guide portion of the cover assembly.

11. The display device according to claim 4, wherein the roller further includes a cover guide portion disposed on the second flat part of the roller, and
a surface of the cover guide portion includes a curved surface corresponding to the curved part of the roller.

12. The display device according to claim 11, wherein the cover guide portion overlaps the second flat part of the roller and the second cover.

13. The display device according to claim 11, wherein the cover guide portion is one of a plurality of cover guide portions,
the fastening member is one of a plurality of fastening members,
the second cover includes a plurality of fastening parts coupled to the second flat portion of the roller, and
the plurality of cover guide portions are disposed between the plurality of fastening parts with the plurality of cover guide portions coupled to the plurality of fastening parts of the second cover by the plurality of fastening members.

14. The display device according to claim 13, wherein the cover guide portion is part of the roller as one singular body with the roller.

15. The display device according to claim 11, wherein the cover assembly is disposed between the protrusion and the cover guide portion in response to the display panel being in a wound configuration around the roller.

16. The display device according to claim 11, wherein the roller includes a first recess disposed in the curved part of the roller.

17. The display device according to claim 16, wherein the first recess is disposed between the protrusion and the cover guide portion, the first recess being adjacent to the protrusion and the roller includes a second recess disposed between the first recess and the cover guide portion in the curved part of the roller.

18. A display device, comprising:
a display panel configured to display images;
a first cover coupled to the display panel;
a roller including a flat part and a curved part, the flat part of the roller including a first flat portion and a second flat portion located further inside the roller than the first flat portion, the roller configured to wind or unwind the display panel and the first cover;
a second cover configured to couple the first cover to the roller; and
a fastening member configured to couple the second cover to the roller at the second flat portion of the roller.

19. The display device according to claim 18, further comprising:
a cover part coupled to the first cover and to the second cover;
a printed circuit board accommodated in the cover part; and
a plurality of flexible films that electrically connect the display panel and the printed circuit board.

20. The display device according to claim 18, wherein the cover part is spaced apart from the fastening member in response to the display panel being fully wound around the roller.

21. The display device according to claim 20, wherein the cover part includes:
a bottom cover disposed on a rear surface of the first cover, the printed circuit board disposed on a rear surface of the bottom cover;
a base plate located on a rear surface of the printed circuit board, the base plate overlapping the bottom cover; and
a top cover extending from the bottom cover and covering one end of the first cover, and
a surface of the bottom cover having a flat surface shape corresponding to the flat surface of the protrusion of the roller.

22. The display device according to claim 21, wherein the roller further includes a cover guide disposed on the second flat portion of the roller and the cover guide portion is one of a plurality of cover guide portions,
the fastening member is one of a plurality of fastening members,
the second cover includes a plurality of fastening parts coupled to the second flat portion of the roller, and
the plurality of cover guide portions are disposed between the plurality of fastening parts of the second cover, the plurality of cover guide portions coupled to the plurality of fastening parts of the second cover by the plurality of fastening members.

* * * * *